United States Patent
Raghavan et al.

(10) Patent No.: US 11,764,850 B2
(45) Date of Patent: Sep. 19, 2023

(54) COMPENSATING FOR TRANSMIT-RECEIVE SPATIAL FILTER ASYMMETRIES IN UPPER MILLIMETER WAVE BANDS

(71) Applicant: QUALCOMM Incorporated, San Diego, CA (US)

(72) Inventors: Vasanthan Raghavan, West Windsor Township, NJ (US); Tao Luo, San Diego, CA (US); Sony Akkarakaran, Poway, CA (US); Yan Zhou, San Diego, CA (US); Junyi Li, Franklin Park, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/245,558

(22) Filed: Apr. 30, 2021

(65) Prior Publication Data
US 2021/0351830 A1    Nov. 11, 2021

Related U.S. Application Data

(60) Provisional application No. 63/021,434, filed on May 7, 2020.

(51) Int. Cl.
*H04B 7/06*     (2006.01)
*H04W 16/28*    (2009.01)
*H04B 7/0404*   (2017.01)

(52) U.S. Cl.
CPC ......... *H04B 7/0691* (2013.01); *H04B 7/0404* (2013.01); *H04B 7/0617* (2013.01); *H04W 16/28* (2013.01)

(58) Field of Classification Search
CPC .. H04B 7/0413; H04B 7/0617; H04B 7/0456; H04B 7/0417; H04B 7/0639
(Continued)

(56) References Cited

U.S. PATENT DOCUMENTS

| 2008/0232325 A1* | 9/2008 | Mehta | H04B 7/061 |
| | | | 370/332 |
| 2009/0042618 A1* | 2/2009 | Hedayat | H04B 7/0413 |
| | | | 455/562.1 |

(Continued)

FOREIGN PATENT DOCUMENTS

WO    WO-2020020453 A1    1/2020

OTHER PUBLICATIONS

International Search Report and Written Opinion—PCT/US2021/030365—ISA/EPO—dated Aug. 4, 2021.

*Primary Examiner* — Sam K Ahn
*Assistant Examiner* — Gina M McKie
(74) *Attorney, Agent, or Firm* — Norton Rose Fulbright US LLP

(57) ABSTRACT

This disclosure provides systems, methods, and apparatuses, including computer programs encoded on computer storage media, for wireless communication. In one aspect of the disclosure, a method of wireless communication includes determining, at a wireless device, a subset of antenna elements of a plurality of antenna elements to be used to communicate with a network entity in a second communication direction. The plurality of antenna elements is used to communicate with the network entity in a first communication direction. The method further includes transmitting, from the wireless device to the network entity, a message indicating that the subset of antenna elements is to be used to communicate in the second communication direction. Other aspects and features are also claimed and described.

28 Claims, 7 Drawing Sheets

(58) Field of Classification Search
USPC .......................................................... 375/267
See application file for complete search history.

(56) References Cited

U.S. PATENT DOCUMENTS

| | | | |
|---|---|---|---|
| 2009/0124290 A1* | 5/2009 | Tao | H04B 7/0874 455/562.1 |
| 2015/0010099 A1* | 1/2015 | Lin | H04B 7/0608 375/267 |
| 2015/0092621 A1* | 4/2015 | Jalloul | H04L 5/1461 370/278 |
| 2017/0126292 A1* | 5/2017 | Takano | H04W 16/28 |
| 2017/0366242 A1* | 12/2017 | Lee | H04B 7/0408 |
| 2017/0374637 A1* | 12/2017 | Akkarakaran | G01S 5/12 |
| 2018/0234149 A1 | 8/2018 | Zhang et al. | |
| 2019/0289563 A1 | 9/2019 | Ghanbarinejad et al. | |
| 2020/0112890 A1 | 4/2020 | Luo et al. | |
| 2020/0178054 A1* | 6/2020 | Simileysky | H04B 17/318 |

\* cited by examiner

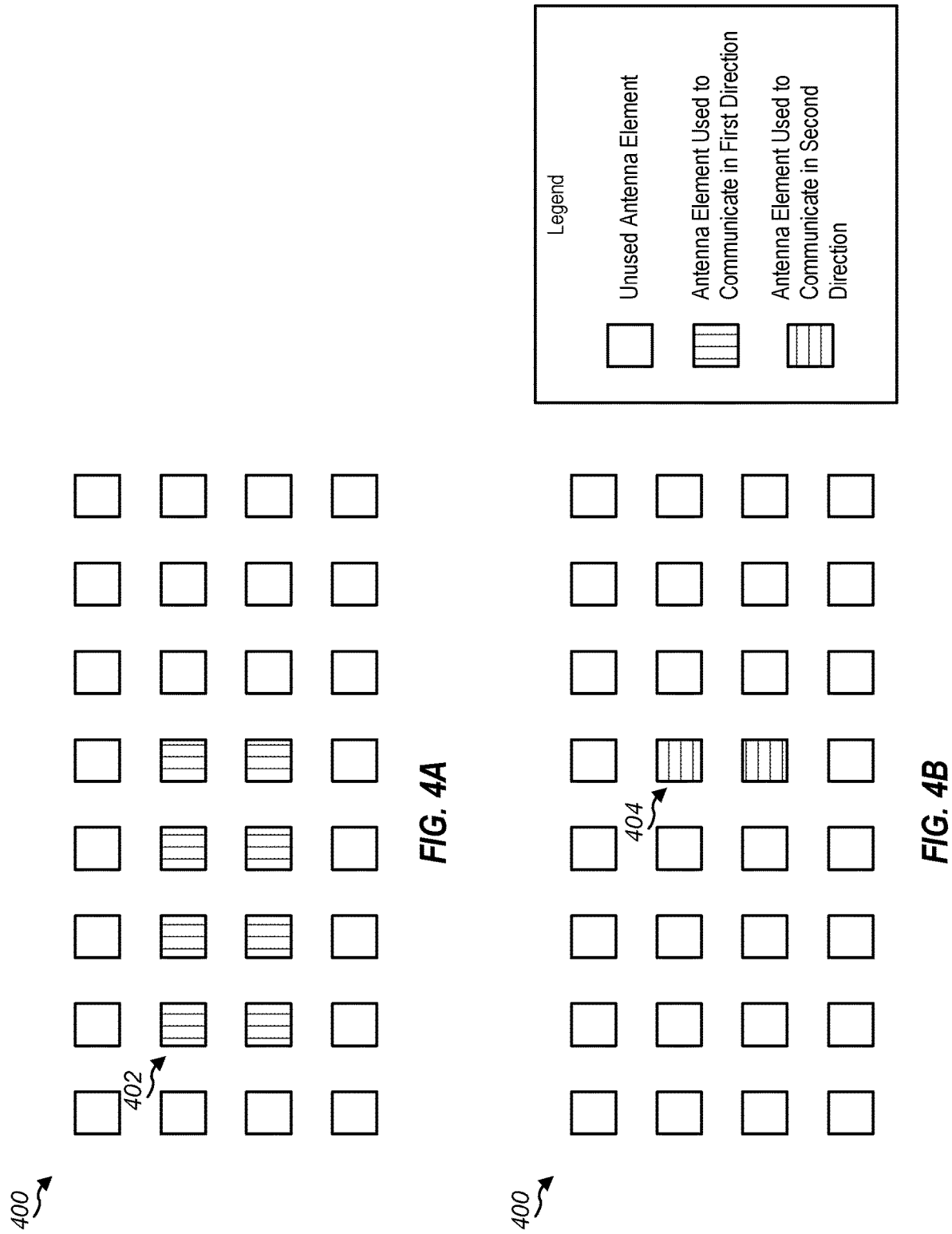

COMPENSATING FOR TRANSMIT-RECEIVE SPATIAL FILTER ASYMMETRIES IN UPPER MILLIMETER WAVE BANDS

CROSS-REFERENCE TO RELATED APPLICATIONS

This application claims the benefit of U.S. Provisional Patent Application No. 63/021,434, entitled, "COMPENSATING FOR TRANSMIT-RECEIVE SPATIAL FILTER ASYMMETRIES IN UPPER MILLIMETER WAVE BANDS," filed on May 7, 2020, which is expressly incorporated by reference herein in its entirety.

TECHNICAL FIELD

Aspects of the present disclosure relate generally to wireless communication systems, and more particularly, to compensating for transmit-receive spatial filter asymmetries in upper millimeter wave bands.

INTRODUCTION

Wireless communication networks are widely deployed to provide various communication services such as voice, video, packet data, messaging, broadcast, and the like. These wireless networks may be multiple-access networks capable of supporting multiple users by sharing the available network resources. Such networks may be multiple access networks that support communications for multiple users by sharing the available network resources.

A wireless communication network may include several components. These components may include wireless communication devices, such as base stations (or node Bs) that may support communication for a number of user equipments (UEs). A UE may communicate with a base station via downlink and uplink. The downlink (or forward link) refers to the communication link from the base station to the UE, and the uplink (or reverse link) refers to the communication link from the UE to the base station.

A base station may transmit data and control information on a downlink to a UE or may receive data and control information on an uplink from the UE. On the downlink, a transmission from the base station may encounter interference due to transmissions from neighbor base stations or from other wireless radio frequency (RF) transmitters. On the uplink, a transmission from the UE may encounter interference from uplink transmissions of other UEs communicating with the neighbor base stations or from other wireless RF transmitters. This interference may degrade performance on both the downlink and uplink.

As the demand for mobile broadband access continues to increase, the possibilities of interference and congested networks grows with more UEs accessing the long-range wireless communication networks and more short-range wireless systems being deployed in communities. Research and development continue to advance wireless technologies not only to meet the growing demand for mobile broadband access, but to advance and enhance the user experience with mobile communications.

In fifth generation (5G) new radio (NR) communication systems, specifically in FR2 5G NR communication systems, an antenna array used by a UE for communication in the uplink is typically the same as the antenna array used by the UE for communication in the downlink. For example, the same plurality of antenna elements that are used by the UE to transmit one or more signals in the uplink may also be used to receive one or more signals in the downlink. Additionally, it is typically assumed that there is uplink and downlink beam correspondence at the UE (or there is a total lack of uplink and downlink beam correspondence). For example, if there is uplink and downlink beam correspondence, beamformed downlink signals may be used to derive beam weights for use in communicating in the uplink, optionally with some calibrations and corrections. However, as 5G communication systems advance to include FR4 (e.g., systems that operate beyond 52.6 gigahertz (GHz), also referred to as upper millimeter wave bands), the assumptions of using the same antenna array on the uplink and downlink, and uplink and downlink beam correspondence at UEs may no longer be applicable.

SUMMARY

The following summarizes some aspects of the present disclosure to provide a basic understanding of the discussed technology. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

In one aspect of the disclosure, a method for wireless communication includes determining, at a user equipment (UE), a subset of antenna elements of a plurality of antenna elements to be used to communicate with a network entity in a second communication direction. The plurality of antenna elements is used to communicate with the network entity in a first communication direction. The method further includes transmitting, from the UE to the network entity, a message indicating that the subset of antenna elements is to be used to communicate in the second communication direction.

In an additional aspect of the disclosure, an apparatus configured for wireless communication is disclosed. The apparatus includes at least one processor, and a memory coupled to the at least one processor. The at least one processor is configured to determine, at a user equipment (UE), a subset of antenna elements of a plurality of antenna elements to be used to communicate with a network entity in a second communication direction. The plurality of antenna elements is used to communicate with the network entity in a first communication direction. The at least one processor is further configured to initiate transmission, from the UE to the network entity, of a message indicating that the subset of antenna elements is to be used to communicate in the second communication direction.

In an additional aspect of the disclosure, an apparatus configured for wireless communication is disclosed. The apparatus includes means for determining, at a user equipment (UE), a subset of antenna elements of a plurality of antenna elements to be used to communicate with a network entity in a second communication direction. The plurality of antenna elements is used to communicate with the network entity in a first communication direction. The apparatus further includes means for transmitting, from the UE to the network entity, a message indicating that the subset of antenna elements is to be used to communicate in the second communication direction.

In an additional aspect of the disclosure, a non-transitory computer-readable medium stores instructions that, when executed by a processor, cause the processor to perform operations including determining, at a user equipment (UE), a subset of antenna elements of a plurality of antenna elements to be used to communicate with a network entity in a second communication direction. The plurality of antenna elements is used to communicate with the network entity in a first communication direction. The operations further include initiating transmission, from the UE to the network entity, of a message indicating that the subset of antenna elements is to be used to communicate in the second communication direction.

In an additional aspect of the disclosure, a method for wireless communication includes receiving, at a network entity from a user equipment (UE), a message indicating that a subset of antenna elements of a plurality of antenna elements is to be used by the UE to communicate with the network entity in a second communication direction. The plurality of antenna elements is used by the UE to communicate with the network entity in a first communication direction. The method further includes transmitting, from the network entity to the UE, a grant message indicating that the UE is allowed to use the subset of antenna elements for communicating in the second communication direction.

In an additional aspect of the disclosure, an apparatus configured for wireless communication is disclosed. The apparatus includes at least one processor, and a memory coupled to the at least one processor. The at least one processor is configured to receive, at a network entity from a user equipment (UE), a message indicating that a subset of antenna elements of a plurality of antenna elements is to be used by the UE to communicate with the network entity in a second communication direction. The plurality of antenna elements is used by the UE to communicate with the network entity in a first communication direction. The at least one processor is further configured to initiate transmission, from the network entity to the UE, of a grant message indicating that the UE is allowed to use the subset of antenna elements for communicating in the second communication direction.

In an additional aspect of the disclosure, an apparatus configured for wireless communication is disclosed. The apparatus includes means for receiving, at a network entity from a user equipment (UE), a message indicating that a subset of antenna elements of a plurality of antenna elements is to be used by the UE to communicate with the network entity in a second communication direction. The plurality of antenna elements is used by the UE to communicate with the network entity in a first communication direction. The apparatus further includes means for transmitting, from the network entity to the UE, a grant message indicating that the UE is allowed to use the subset of antenna elements for communicating in the second communication direction.

In an additional aspect of the disclosure, a non-transitory computer-readable medium stores instructions that, when executed by a processor, cause the processor to perform operations including receiving, at a network entity from a user equipment (UE), a message indicating that a subset of antenna elements of a plurality of antenna elements is to be used by the UE to communicate with the network entity in a second communication direction. The plurality of antenna elements is used by the UE to communicate with the network entity in a first communication direction. The operations further include initiating transmission, from the network entity to the UE, of a grant message indicating that the UE is allowed to use the subset of antenna elements for communicating in the second communication direction.

Other aspects, features, and implementations will become apparent to those of ordinary skill in the art, upon reviewing the following description of specific, exemplary aspects in conjunction with the accompanying figures. While features may be discussed relative to certain aspects and figures below, various aspects may include one or more of the advantageous features discussed herein. In other words, while one or more aspects may be discussed as having certain advantageous features, one or more of such features may also be used in accordance with the various aspects. In similar fashion, while exemplary aspects may be discussed below as device, system, or method aspects the exemplary aspects may be implemented in various devices, systems, and methods.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

FIGS. 4A and 4B illustrate example configurations of an antenna array of a UE according to one or more aspects.

DETAILED DESCRIPTION

Figure 1:
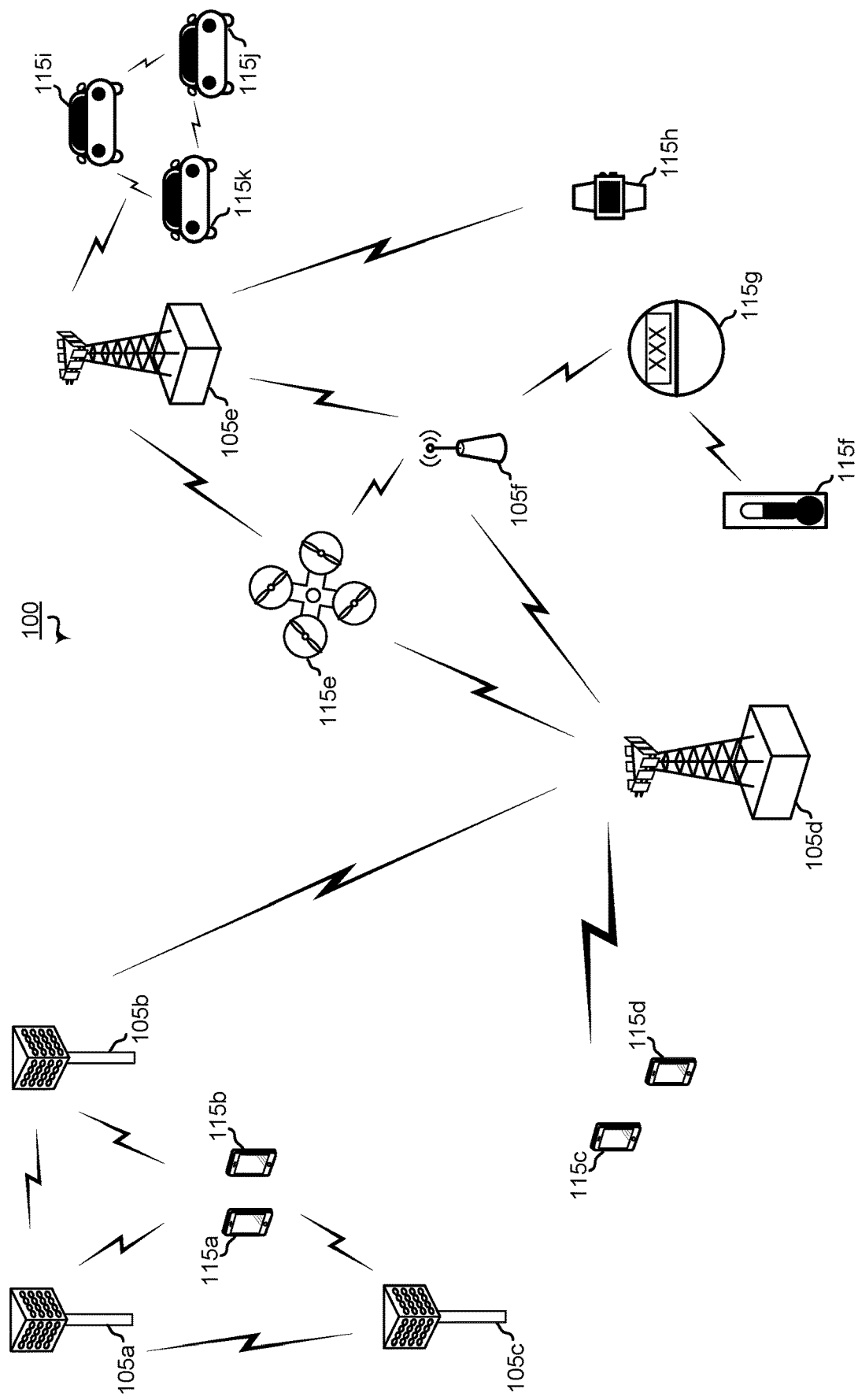
FIG. 1 is a block diagram illustrating details of an example wireless communication system according to one or more aspects.

The detailed description set forth below, in connection with the appended drawings, is intended as a description of various configurations and is not intended to limit the scope of the disclosure. Rather, the detailed description includes specific details for the purpose of providing a thorough understanding of the inventive subject matter. It will be apparent to those skilled in the art that these specific details are not required in every case and that, in some instances, well-known structures and components are shown in block diagram form for clarity of presentation.

The present disclosure provides systems, apparatus, methods, and computer-readable media that support compensating for transmit-receive spatial filter asymmetries in upper millimeter wave bands, such as those that are greater than 52.6 GHz. For example, the systems, apparatus, methods, and computer-readable media described herein may be configured to enable a wireless device, such as user equipment (UE), to communicate, in an uplink (or a downlink) direction, using a subset of a plurality of antenna elements that is used to communicate in the downlink (or the uplink) direction, which may at least partially maintain uplink and downlink beam correspondence and may be implemented using fewer processing resources and less power consumption than if there was a total lack of uplink and downlink beam correspondence at the wireless device. Because the antenna elements used to communicate in the uplink (or the downlink) are a subset of the antenna elements used to communicate in the downlink (or the uplink), spatial filter asymmetries (e.g., differences in beamforming weights used to enable communications) in the uplink and the downlink may be compensated for, as further described herein.

To illustrate, a UE may determine that a subset of antenna elements is to be used to communicate with a network entity, such as a base station, in a second communication direction. The subset of antenna elements is a subset (e.g., a proper subset) of a plurality of antenna elements used by the UE to communicate with the network entity in a first communication direction. In some implementations, the first communication direction is opposite to the second communication direction. As one example, the first communication direction may be a downlink direction, and the second communication direction may be an uplink direction. As an alternate example, the first communication direction may be the uplink direction, and the second communication direction may be the downlink direction.

After determining (e.g., identifying) the subset of antenna elements, the UE transmits to the network entity a message that indicates that the subset of antenna elements is to be used to communicate in the second communication direction. In some implementations, indication of the subset of antenna elements is included in the message. Alternatively, the message may indicate that a different antenna array is used in the second communication direction than in the first communication direction, and the message may not indicate a lack of beam correspondence between the first communication direction and the second communication direction, or may indicate a mixed-mode beam correspondence between the first communication direction and the second communication direction. For example, the message may include a multi-bit field, such as a UE capability field, that indicates a state that is different than a state corresponding to a lack of beam correspondence (e.g., no beam correspondence) and a state that corresponds to beam correspondence (e.g., full beam correspondence).

Based on receiving the message from the UE, the network entity may transmit, to the UE, a grant message that indicates that the UE is allowed to use the subset of antenna elements for communicating in the second communication direction. Based on receiving the grant message from the network entity, the UE may perform one or more communications with the network entity in the second communication direction using the subset of antenna elements. Because there is not a total lack of beam correspondence between the first communication direction and the second communication direction, a second set of beamforming weights that are applied by the UE to communications in the second communication direction may be a subset (e.g., a proper subset) of a first set of beamforming weights that are applied by the UE to communications in the first communication direction. Optionally, the UE may perform one or more calibration operations on the second set of beamforming weights prior to applying the second set of beamforming weights to communications in the second communication direction. Alternatively, the UE may receive, from the network entity, one or more channel state information reference signals (CSI-RSs) based on transmitting the message, and the UE may generate a set of beamforming weights for use in communicating in the second communication direction based on one or more beam measurement operations performed on the one or more CSI-RSs.

Particular implementations of the subject matter described in this disclosure may be implemented to realize one or more of the following potential advantages. In some aspects, the present disclosure provides techniques for compensating for spatial filter asymmetries at a UE. For example, although the first set of beamforming weights used by the UE to communicate in the first communication direction do not have a one-to-one correspondence with the second set of beamforming weights used by the UE to communicate in the second communication direction, the second set of beamforming weights is a subset of the first set of beamforming weights, such that each beamforming weight included in the second set of beamforming weights is also included in the first set of beamforming weights. Using a subset of the first beamforming weights for communications in the second communication direction enables the UE to determine the second set of beamforming weights without performing beam measurements on signals communicated in the second communication direction, which may increase speed of and reduce processing resources used for the determination of the second set of beamforming weights. Additionally, if the second communication direction is the uplink direction, using fewer antenna elements in the second communication direction uses fewer power amplifiers (e.g., in the transmit paths of the antenna elements), which reduces power consumption at the UE. This may also reduce the thermal overshoots as less power is consumed and dissipated at the UE.

This disclosure relates generally to providing or participating in authorized shared access between two or more wireless devices in one or more wireless communications systems, also referred to as wireless communications networks. In various implementations, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, GSM networks, 5th Generation (5G) or new radio (NR) networks (sometimes referred to as "5G NR" networks, systems, or devices), as well as other communications networks. As described herein, the terms "networks" and "systems" may be used interchangeably.

A CDMA network, for example, may implement a radio technology such as universal terrestrial radio access (UTRA), cdma2000, and the like. UTRA includes wideband-CDMA (W-CDMA) and low chip rate (LCR). CDMA2000 covers IS-2000, IS-95, and IS-856 standards.

A TDMA network may, for example implement a radio technology such as Global System for Mobile Communication (GSM). The 3rd Generation Partnership Project (3GPP) defines standards for the GSM EDGE (enhanced data rates for GSM evolution) radio access network (RAN), also denoted as GERAN. GERAN is the radio component of GSM/EDGE, together with the network that joins the base stations (for example, the Ater and Abis interfaces) and the base station controllers (A interfaces, etc.). The radio access network represents a component of a GSM network, through which phone calls and packet data are routed from and to the public switched telephone network (PSTN) and Internet to and from subscriber handsets, also known as user terminals or user equipments (UEs). A mobile phone operator's network may comprise one or more GERANs, which may be coupled with UTRANs in the case of a UMTS/GSM network. Additionally, an operator network may also include one or more LTE networks, or one or more other networks. The various different network types may use different radio access technologies (RATs) and radio access networks (RANs).

An OFDMA network may implement a radio technology such as evolved UTRA (E-UTRA), Institute of Electrical and Electronics Engineers (IEEE) 802.11, IEEE 802.16, IEEE 802.20, flash-OFDM and the like. UTRA, E-UTRA, and GSM are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3GPP is a collaboration between groups of telecommunications associations that aims to define a globally applicable third generation (3G) mobile phone specification. 3GPP LTE is a 3GPP project which was aimed at improving the UMTS mobile phone standard. The 3GPP may define specifications for the next generation of mobile networks, mobile systems, and mobile devices. The present disclosure may describe certain aspects with reference to LTE, 4G, or 5G NR technologies; however, the description is not intended to be limited to a specific technology or application, and one or more aspects described with reference to one technology may be understood to be applicable to another technology. Additionally, one or more aspects of the present disclosure may be related to shared access to wireless spectrum between networks using different radio access technologies or radio air interfaces.

5G networks contemplate diverse deployments, diverse spectrum, and diverse services and devices that may be implemented using an OFDM-based unified, air interface. To achieve these goals, further enhancements to LTE and LTE-A are considered in addition to development of the new radio technology for 5G NR networks. The 5G NR will be capable of scaling to provide coverage (1) to a massive Internet of things (IoTs) with an ultra-high density (e.g., ~1 M nodes/km$^2$), ultra-low complexity (e.g., ~10 s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~1 millisecond (ms)), and users with wide ranges of mobility or lack thereof; and (3) with enhanced mobile broadband including extreme high capacity (e.g., ~10 Tbps/km$^2$), extreme data rates (e.g., multi-Gbps rate, 100+ Mbps user experienced rates), and deep awareness with advanced discovery and optimizations.

Devices, networks, and systems may be configured to communicate via one or more portions of the electromagnetic spectrum. The electromagnetic spectrum is often subdivided, based on frequency or wavelength, into various classes, bands, channels, etc. In 5G NR two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" (mmWave) band in documents and articles, despite being different from the extremely high frequency (EHF) band (30 GHz-300 GHz) which is identified by the International Telecommunications Union (ITU) as a "mmWave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "mmWave" or the like if used herein may broadly represent frequencies that may include mid-band frequencies, may be within FR2, or may be within the EHF band.

5G NR devices, networks, and systems may be implemented to use optimized OFDM-based waveform features. These features may include scalable numerology and transmission time intervals (TTIs); a common, flexible framework to efficiently multiplex services and features with a dynamic, low-latency time division duplex (TDD) or low-latency frequency division duplex (FDD) design; and advanced wireless technologies, such as massive multiple input, multiple output (MIMO), robust mmWave transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD or TDD implementations, subcarrier spacing may occur with 15 kHz, for example over 1, 5, 10, 20 MHz, and the like bandwidth. For other various outdoor and small cell coverage deployments of TDD greater than 3 GHz, subcarrier spacing may occur with 30 kHz over 80/100 MHz bandwidth. For other various indoor wideband implementations, using a TDD over the unlicensed portion of the 5 GHz band, the subcarrier spacing may occur with 60 kHz over a 160 MHz bandwidth. Finally, for various deployments transmitting with mmWave components at a TDD of 28 GHz, subcarrier spacing may occur with 120 kHz over a 500 MHz bandwidth.

The scalable numerology of 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with uplink or downlink scheduling information, data, and acknowledgement in the same subframe. The self-contained integrated subframe supports communications in unlicensed or contention-based shared spectrum, adaptive uplink or downlink that may be flexibly configured on a per-cell basis to dynamically switch between uplink and downlink to meet the current traffic needs.

For clarity, certain aspects of the apparatus and techniques may be described below with reference to example 5G NR implementations or in a 5G-centric way, and 5G terminology may be used as illustrative examples in portions of the description below; however, the description is not intended to be limited to 5G applications.

Moreover, it should be understood that, in operation, wireless communication networks adapted according to the concepts herein may operate with any combination of licensed or unlicensed spectrum depending on loading and availability. Accordingly, it will be apparent to a person having ordinary skill in the art that the systems, apparatus and methods described herein may be applied to other communications systems and applications than the particular examples provided.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, implementations or uses may come about via integrated chip implementations or other non-module-component based devices (e.g., end-user devices, vehicles, communication devices, computing devices, industrial equipment, retail devices or purchasing devices, medical devices, AI-enabled devices, etc.). While some examples may or may not be specifically directed to use cases or applications, a wide assortment of applicability of described innovations may occur. Implementations may range from chip-level or modular components to non-modular, non-chip-level implementations and further to aggregated, distributed, or original equipment manufacturer (OEM) devices or systems incorporating one or more described aspects. In some practical settings, devices incorporating described aspects and features may also necessarily include additional components and features for implementation and practice of claimed and described aspects. It is intended that innovations described herein may be practiced in a wide variety of implementations, including both large devices or small devices, chip-level components, multi-component systems (e.g., radio frequency (RF)-chain, communication interface, processor), distributed arrangements, end-user devices, etc. of varying sizes, shapes, and constitution.

FIG. 1 is a block diagram illustrating details of an example wireless communication system according to one or more aspects. The wireless communication system may include wireless network 100. Wireless network 100 may, for example, include a 5G wireless network. As appreciated by those skilled in the art, components appearing in FIG. 1 are likely to have related counterparts in other network arrangements including, for example, cellular-style network arrangements and non-cellular-style-network arrangements (e.g., device to device or peer to peer or ad hoc network arrangements, etc.).

Wireless network 100 illustrated in FIG. 1 includes a number of base stations 105 and other network entities. A base station may be a station that communicates with the UEs and may also be referred to as an evolved node B (eNB), a next generation eNB (gNB), an access point, and the like. Each base station 105 may provide communication coverage for a particular geographic area. In 3GPP, the term "cell" may refer to this particular geographic coverage area of a base station or a base station subsystem serving the coverage area, depending on the context in which the term is used. In implementations of wireless network 100 herein, base stations 105 may be associated with a same operator or different operators (e.g., wireless network 100 may include a plurality of operator wireless networks). Additionally, in implementations of wireless network 100 herein, base station 105 may provide wireless communications using one or more of the same frequencies (e.g., one or more frequency bands in licensed spectrum, unlicensed spectrum, or a combination thereof) as a neighboring cell. In some examples, an individual base station 105 or UE 115 may be operated by more than one network operating entity. In some other examples, each base station 105 and UE 115 may be operated by a single network operating entity.

A base station may provide communication coverage for a macro cell or a small cell, such as a pico cell or a femto cell, or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A base station for a macro cell may be referred to as a macro base station. A base station for a small cell may be referred to as a small cell base station, a pico base station, a femto base station or a home base station. In the example shown in FIG. 1, base stations 105d and 105e are regular macro base stations, while base stations 105a-105c are macro base stations enabled with one of 3 dimension (3D), full dimension (FD), or massive MIMO. Base stations 105a-105c take advantage of their higher dimension MIMO capabilities to exploit 3D beamforming in both elevation and azimuth beamforming to increase coverage and capacity. Base station 105f is a small cell base station which may be a home node or portable access point. A base station may support one or multiple (e.g., two, three, four, and the like) cells.

Wireless network 100 may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. In some scenarios, networks may be enabled or configured to handle dynamic switching between synchronous or asynchronous operations.

UEs 115 are dispersed throughout the wireless network 100, and each UE may be stationary or mobile. It should be appreciated that, although a mobile apparatus is commonly referred to as UE in standards and specifications promulgated by the 3GPP, such apparatus may additionally or otherwise be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, a gaming device, an augmented reality device, a vehicular component, vehicular device, or vehicular module, or some other suitable terminology. Within the present document, a "mobile" apparatus or UE need not necessarily have a capability to move, and may be stationary. Some non-limiting examples of a mobile apparatus, such as may include implementations of one or more of UEs 115, include a mobile, a cellular (cell) phone, a smart phone, a session initiation protocol (SIP) phone, a wireless local loop (WLL) station, a laptop, a personal computer (PC), a notebook, a netbook, a smart book, a tablet, and a personal digital assistant (PDA). A mobile apparatus may additionally be an IoT or "Internet of everything" (IoE) device such as an automotive or other transportation vehicle, a satellite radio, a global positioning system (GPS) device, a global navigation satellite system (GNSS) device, a logistics controller, a drone, a multi-copter, a quad-copter, a smart energy or security device, a solar panel or solar array, municipal lighting, water, or other infrastructure; industrial automation and enterprise devices; consumer and wearable devices, such as eyewear, a wearable camera, a smart watch, a health or fitness tracker, a mammal implantable device, gesture tracking device, medical device, a digital audio player (e.g., MP3 player), a camera, a game console, etc.; and digital home or smart home devices such as a home audio, video, and multimedia device, an appliance, a sensor, a vending machine, intelligent lighting, a home security system, a smart meter, etc. In one aspect, a UE may be a device that includes a Universal Integrated Circuit Card (UICC). In another aspect, a UE may be a device that does not include a UICC. In some aspects, UEs that do not include UICCs may also be referred to as IoE devices. UEs 115a-115d of the implementation illustrated in FIG. 1 are examples of mobile smart phone-type devices accessing wireless network 100 A UE may also be a machine specifically configured for connected communication, including machine type communication (MTC), enhanced MTC (eMTC), narrowband IoT (NB-IoT) and the like. UEs 115e-115k illustrated in FIG. 1 are examples of various machines configured for communication that access wireless network 100.

A mobile apparatus, such as UEs 115, may be able to communicate with any type of the base stations, whether macro base stations, pico base stations, femto base stations, relays, and the like. In FIG. 1, a communication link (represented as a lightning bolt) indicates wireless transmissions between a UE and a serving base station, which is a base station designated to serve the UE on the downlink or uplink, or desired transmission between base stations, and backhaul transmissions between base stations. UEs may operate as base stations or other network nodes in some scenarios. Backhaul communication between base stations of wireless network 100 may occur using wired or wireless communication links.

In operation at wireless network 100, base stations 105a-105c serve UEs 115a and 115b using 3D beamforming and coordinated spatial techniques, such as coordinated multipoint (CoMP) or multi-connectivity. Macro base station 105d performs backhaul communications with base stations 105a-105c, as well as small cell, base station 105f. Macro base station 105d also transmits multicast services which are subscribed to and received by UEs 115c and 115d. Such multicast services may include mobile television or stream video, or may include other services for providing community information, such as weather emergencies or alerts, such as Amber alerts or gray alerts.

Wireless network 100 of implementations supports mission critical communications with ultra-reliable and redundant links for mission critical devices, such UE 115e, which is a drone. Redundant communication links with UE 115e include from macro base stations 105d and 105e, as well as small cell base station 105f. Other machine type devices, such as UE 115f (thermometer), UE 115g (smart meter), and UE 115h (wearable device) may communicate through wireless network 100 either directly with base stations, such as small cell base station 105f, and macro base station 105e, or in multi-hop configurations by communicating with another user device which relays its information to the network, such as UE 115f communicating temperature measurement information to the smart meter, UE 115g, which is then reported to the network through small cell base station 105f. Wireless network 100 may also provide additional network efficiency through dynamic, low-latency TDD communications or low-latency FDD communications, such as in a vehicle-to-vehicle (V2V) mesh network between UEs 115i-115k communicating with macro base station 105e.

Figure 2:
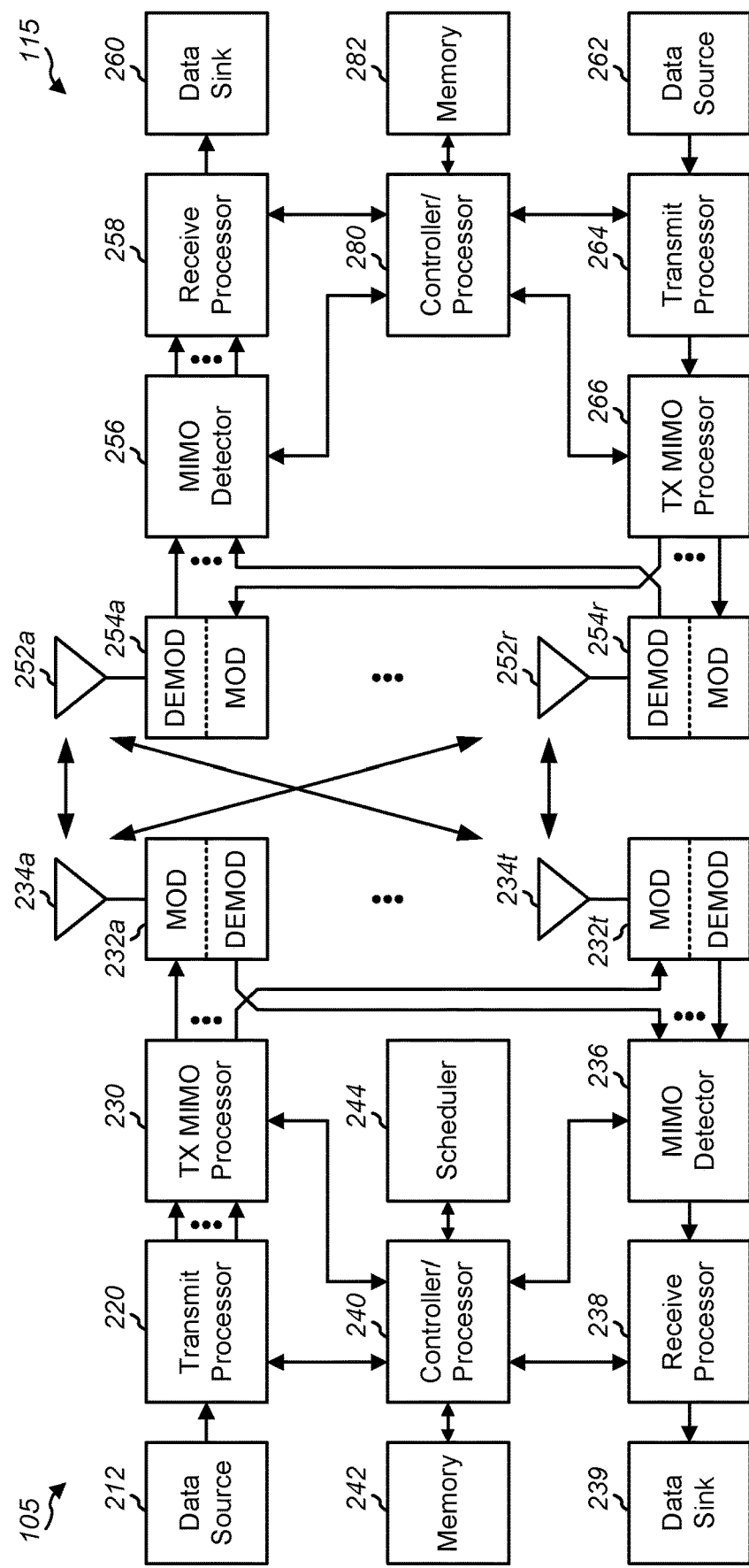
FIG. 2 is a block diagram illustrating examples of a base station and a user equipment (UE) according to one or more aspects.

FIG. 2 is a block diagram illustrating examples of base station 105 and UE 115 according to one or more aspects. Base station 105 and UE 115 may be any of the base stations and one of the UEs in FIG. 1. For a restricted association scenario (as mentioned above), base station 105 may be small cell base station 105f in FIG. 1, and UE 115 may be UE 115c or 115d operating in a service area of base station 105f, which in order to access small cell base station 105f, would be included in a list of accessible UEs for small cell base station 105f. Base station 105 may also be a base station of some other type. As shown in FIG. 2, base station 105 may be equipped with antennas 234a through 234t, and UE 115 may be equipped with antennas 252a through 252r for facilitating wireless communications.

At base station 105, transmit processor 220 may receive data from data source 212 and control information from controller 240, such as a processor. The control information may be for a physical broadcast channel (PBCH), a physical control format indicator channel (PCFICH), a physical hybrid-ARQ (automatic repeat request) indicator channel (PHICH), a physical downlink control channel (PDCCH), an enhanced physical downlink control channel (EPDCCH), an MTC physical downlink control channel (MPDCCH), etc. The data may be for a physical downlink shared channel (PDSCH), etc. Additionally, transmit processor 220 may process (e.g., encode and symbol map) the data and control information to obtain data symbols and control symbols, respectively. Transmit processor 220 may also generate reference symbols, e.g., for the primary synchronization signal (PSS) and secondary synchronization signal (SSS), and cell-specific reference signal. Transmit (TX) MIMO processor 230 may perform spatial processing (e.g., precoding) on the data symbols, the control symbols, or the reference symbols, if applicable, and may provide output symbol streams to modulators (MODs) 232a through 232t. For example, spatial processing performed on the data symbols, the control symbols, or the reference symbols may include precoding. Each modulator 232 may process a respective output symbol stream (e.g., for OFDM, etc.) to obtain an output sample stream. Each modulator 232 may additionally or alternatively process (e.g., convert to analog, amplify, filter, and upconvert) the output sample stream to obtain a downlink signal. Downlink signals from modulators 232a through 232t may be transmitted via antennas 234a through 234t, respectively.

At UE 115, antennas 252a through 252r may receive the downlink signals from base station 105 and may provide received signals to demodulators (DEMODs) 254a through 254r, respectively. Each demodulator 254 may condition (e.g., filter, amplify, downconvert, and digitize) a respective received signal to obtain input samples. Each demodulator 254 may further process the input samples (e.g., for OFDM, etc.) to obtain received symbols. MIMO detector 256 may obtain received symbols from demodulators 254a through 254r, perform MIMO detection on the received symbols if applicable, and provide detected symbols. Receive processor 258 may process (e.g., demodulate, deinterleave, and decode) the detected symbols, provide decoded data for UE 115 to data sink 260, and provide decoded control information to controller 280, such as a processor.

On the uplink, at UE 115, transmit processor 264 may receive and process data (e.g., for a physical uplink shared channel (PUSCH)) from data source 262 and control information (e.g., for a physical uplink control channel (PUCCH)) from controller 280. Additionally, transmit processor 264 may also generate reference symbols for a reference signal. The symbols from transmit processor 264 may be precoded by TX MIMO processor 266 if applicable, further processed by modulators 254a through 254r (e.g., for SC-FDM, etc.), and transmitted to base station 105. At base station 105, the uplink signals from UE 115 may be received by antennas 234, processed by demodulators 232, detected by MIMO detector 236 if applicable, and further processed by receive processor 238 to obtain decoded data and control information sent by UE 115. Receive processor 238 may provide the decoded data to data sink 239 and the decoded control information to controller 240.

Controllers 240 and 280 may direct the operation at base station 105 and UE 115, respectively. Controller 240 or other processors and modules at base station 105 or controller 280 or other processors and modules at UE 115 may perform or direct the execution of various processes for the techniques described herein, such as to perform or direct the execution illustrated in FIGS. 5-6, or other processes for the techniques described herein. Memories 242 and 282 may store data and program codes for base station 105 and UE 115, respectively. Scheduler 244 may schedule UEs for data transmission on the downlink or the uplink.

Wireless communications systems operated by different network operating entities (e.g., network operators) may share spectrum. In some instances, a network operating entity may be configured to use an entirety of a designated shared spectrum for at least a period of time before another network operating entity uses the entirety of the designated shared spectrum for a different period of time. Thus, in order to allow network operating entities use of the full designated shared spectrum, and in order to mitigate interfering communications between the different network operating entities, certain resources (e.g., time) may be partitioned and allocated to the different network operating entities for certain types of communication.

For example, a network operating entity may be allocated certain time resources reserved for exclusive communication by the network operating entity using the entirety of the shared spectrum. The network operating entity may also be allocated other time resources where the entity is given priority over other network operating entities to communicate using the shared spectrum. These time resources, prioritized for use by the network operating entity, may be utilized by other network operating entities on an opportunistic basis if the prioritized network operating entity does not utilize the resources. Additional time resources may be allocated for any network operator to use on an opportunistic basis.

Access to the shared spectrum and the arbitration of time resources among different network operating entities may be centrally controlled by a separate entity, autonomously determined by a predefined arbitration scheme, or dynamically determined based on interactions between wireless nodes of the network operators.

In some cases, UE 115 and base station 105 may operate in a shared radio frequency spectrum band, which may include licensed or unlicensed (e.g., contention-based) frequency spectrum. In an unlicensed frequency portion of the shared radio frequency spectrum band, UEs 115 or base stations 105 may traditionally perform a medium-sensing procedure to contend for access to the frequency spectrum. For example, UE 115 or base station 105 may perform a listen-before-talk or listen-before-transmitting (LBT) procedure such as a clear channel assessment (CCA) prior to communicating in order to determine whether the shared channel is available. In some implementations, a CCA may include an energy detection procedure to determine whether there are any other active transmissions. For example, a device may infer that a change in a received signal strength indicator (RSSI) of a power meter indicates that a channel is occupied. Specifically, signal power that is concentrated in a certain bandwidth and exceeds a predetermined noise floor may indicate another wireless transmitter. A CCA also may include detection of specific sequences that indicate use of the channel. For example, another device may transmit a specific preamble prior to transmitting a data sequence. In some cases, an LBT procedure may include a wireless node adjusting its own backoff window based on the amount of energy detected on a channel or the acknowledge/negative-acknowledge (ACK/NACK) feedback for its own transmitted packets as a proxy for collisions.

The present disclosure provides systems, apparatus, methods, and computer-readable media that support compensating for transmit-receive spatial filter asymmetries in upper millimeter wave bands, such as those that are greater than 52.6 GHz. For example, the systems, apparatus, methods, and computer-readable media described herein may be configured to enable a wireless device, such as a UE, to communicate, in an uplink (or a downlink) direction, using a subset of a plurality of antenna elements that is used to communicate in the downlink (or the uplink) direction, which may at least partially maintain uplink and downlink beam correspondence and may be implemented using fewer processing resources and less power consumption and thermal overshoots than if there was a total lack of uplink and downlink beam correspondence at the wireless device. Because the antenna elements used to communicate in the uplink (or the downlink) are a subset of the antenna elements used to communicate in the downlink (or the uplink), spatial filter asymmetries (e.g., differences in beamforming weights used to enable communications) in the uplink and the downlink may be compensated for, as further described herein.

To illustrate, a UE may determine that a subset of antenna elements is to be used to communicate with a network entity, such as a base station, in a second communication direction. The subset of antenna elements is a subset (e.g., a proper subset) of a plurality of antenna elements used by the UE to communicate with the network entity in a first communication direction. In some implementations, the first communication direction is opposite to the second communication direction. As one example, the first communication direction may be a downlink direction, and the second communication direction may be an uplink direction. As an alternate example, the first communication direction may be the uplink direction, and the second communication direction may be the downlink direction.

After determining (e.g., identifying) the subset of antenna elements, the UE transmits to the network entity a message that indicates that the subset of antenna elements is to be used to communicate in the second communication direction. In some implementations, indication of the subset of antenna elements is included in the message. Alternatively, the message may indicate that a different antenna array is used in the second communication direction than in the first communication direction, and the message may not indicate a lack of beam correspondence between the first communication direction and the second communication direction, or may indicate a mixed-mode beam correspondence between the first communication direction and the second communication direction. For example, the message may include a multi-bit field, such as a UE capability field, that indicates a state that is different than a state corresponding to a lack of beam correspondence (e.g., no beam correspondence) and a state that corresponds to beam correspondence (e.g., full beam correspondence).

Based on receiving the message from the UE, the network entity may transmit, to the UE, a grant message that indicates that the UE is allowed to use the subset of antenna elements for communicating in the second communication direction. Based on receiving the grant message from the network entity, the UE may perform one or more communications with the network entity in the second communication direction using the subset of antenna elements. Because there is not a total lack of beam correspondence between the first communication direction and the second communication direction, a second set of beamforming weights that are applied by the UE to communications in the second communication direction may be a subset (e.g., a proper subset) of a first set of beamforming weights that are applied by the UE to communications in the first communication direction. Optionally, the UE may perform one or more calibration operations on the second set of beamforming weights prior to applying the second set of beamforming weights to communications in the second communication direction. Alternatively, the UE may receive, from the network entity, one or more CSI-RSs based on transmitting the message, and the UE may generate a set of beamforming weights for use in communicating in the second communication direction based on one or more beam measurement operations performed on the one or more CSI-RSs.

Particular implementations of the subject matter described in this disclosure may be implemented to realize one or more of the following potential advantages. In some aspects, the present disclosure provides techniques for compensating for spatial filter asymmetries at a UE. For example, although the first set of beamforming weights used by the UE to communicate in the first communication direction do not have a one-to-one correspondence with the second set of beamforming weights used by the UE to communicate in the second communication direction, the second set of beamforming weights is a subset of the first set of beamforming weights, such that each beamforming weight included in the second set of beamforming weights is also included in the first set of beamforming weights. Using a subset of the first beamforming weights for communications in the second communication direction enables the UE to determine the second set of beamforming weights without performing beam measurements on signals communicated in the second communication direction, which may increase speed of and reduce processing resources used for the determination of the second set of beamforming weights. Additionally, if the second communication direction is the uplink direction, using fewer antenna elements in the second communication direction uses fewer power amplifiers (e.g., in the transmit paths of the antenna elements), which reduces power consumption at the UE. Further, thermal constraints are also reduced as less power is consumed and dissipated at the UE.

Figure 3:
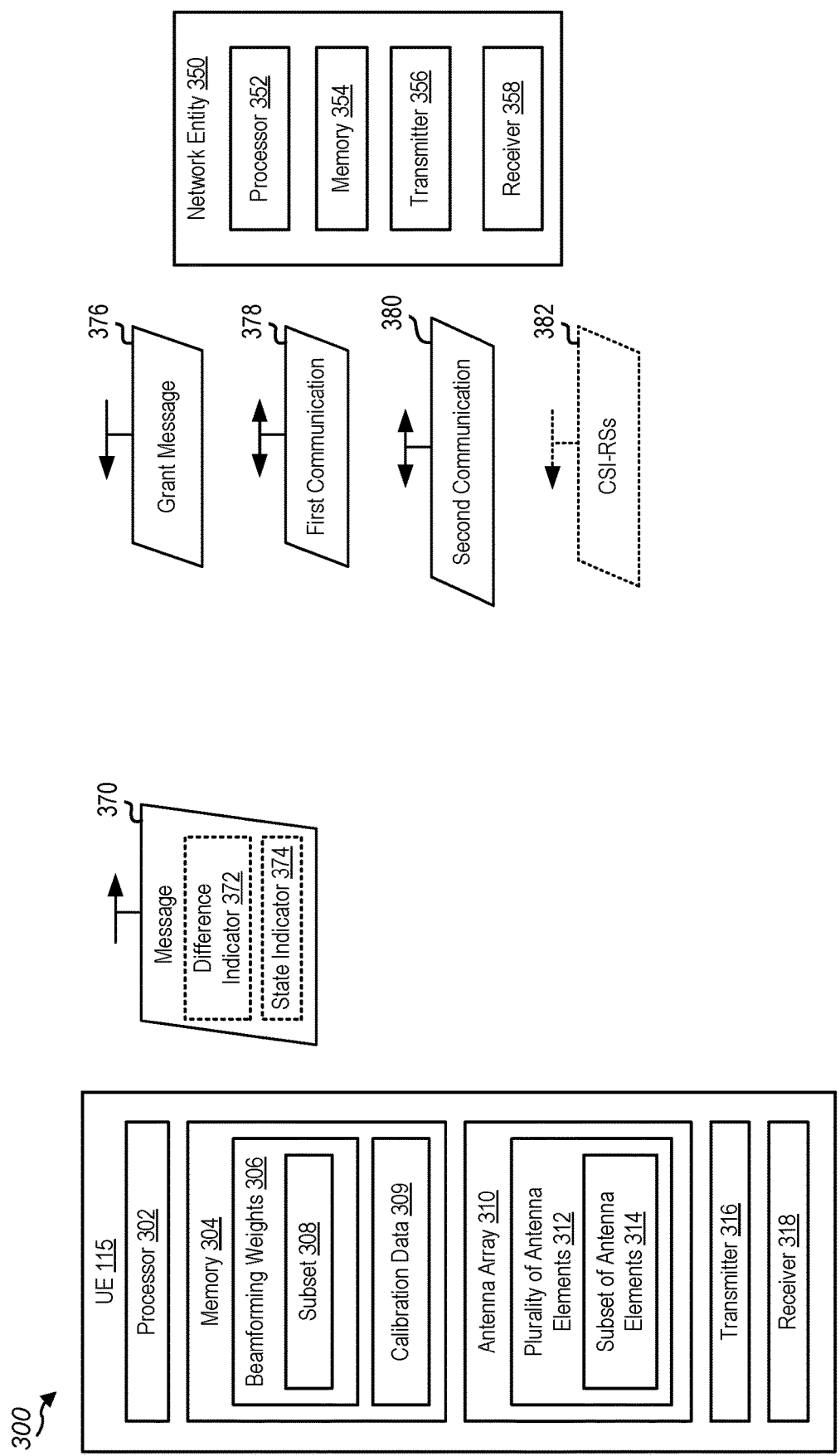
FIG. 3 is a block diagram illustrating an example wireless communication system that supports compensating for transmit-receive spatial filter asymmetries according to one or more aspects.

FIG. 3 is a block diagram of an example wireless communications system 300 that supports compensating for transmit-receive spatial filter asymmetries according to one or more aspects. In some implementations, wireless communications system 300 may implement aspects of wireless network 100. Wireless communications system 300 includes UE 115 and a network entity 350. Network entity 350 may include or correspond to a base station, such as base station 105, a network, a network core, or another network device, as illustrative, non-limiting examples. Although one UE 115 and one network entity 350 are illustrated, in some other implementations, wireless communications system 300 may generally include multiple UEs 115, and may include more than one network entity 350. Although described in FIG. 3 as UE 115, in some other implementations, the operations described with reference to UE 115 may be performed by other types of wireless devices, such as customer premise equipments (CPEs), repeaters, relay nodes, and integrated access backhaul (IAB) nodes, as non-limiting examples, which may benefit from reduced thermal constraints.

UE 115 may include a variety of components (such as structural, hardware components) used for carrying out one or more functions described herein. For example, these components may include a processor 302, a memory 304, an antenna array 310, a transmitter 316, and a receiver 318. Processor 302 may be configured to execute instructions stored at memory 304 to perform the operations described herein. In some implementations, processor 302 includes or corresponds to controller 280, and memory 304 includes or corresponds to memory 282.

Memory 304 may be configured to store beamforming weights 306, calibration data 309, or a combination thereof. Beamforming weights 306 may be applied by UE 115 to signals to be communicated in a particular communication direction to enable communication of the signals via beamforming, such as via one or more elements of antenna array 310. In some implementations, beamforming weights 306 may be applied to communications in a first communication direction, and a subset 308 of beamforming weights 306 may be applied to communications in a second communication direction, as further described herein.

Calibration data 309 may include data that enables UE 115 to perform one or more calibration operations on beamforming weights used in the first communication direction to calibrate beamforming weights used in the second communication direction. For example, calibration data 309 may represent differences in components of communication paths corresponding to the first communication direction as compared to components of communication paths corresponding to the second communication direction, such as differences between components of a receive path compared to components of a transmit path, as a non-limiting example.

Transmitter 316 is configured to transmit reference signals, control information, and data to one or more other devices, and receiver 318 is configured to receive reference signals, synchronization signals, control information, and data from one or more other devices. For example, transmitter 316 may transmit signaling, control information, and data, and receiver 318 may receive signaling, control information, and data, via a network, such as a wired network, a wireless network, or a combination thereof. For example, UE 115 may be configured to transmit or receive signaling, control information, and data via a direct device-to-device connection, a local area network (LAN), a wide area network (WAN), a modem-to-modem connection, the Internet, intranet, extranet, cable transmission system, cellular communication network, any combination of the above, or any other communications network now known or later developed within which permits two or more electronic devices to communicate. In some implementations, transmitter 316 and receiver 318 may be integrated in a transceiver. Additionally, or alternatively, transmitter 316, receiver 318, or both may include and correspond to one or more components of UE 115 described with reference to FIG. 2.

Antenna array 310 may be configured to transmit, or receive, signaling, control information, and data from one or more other devices, such as network entity 350. Antenna array 310 includes a plurality of antenna elements 312. Each antenna element of plurality of antenna elements 312 may be configured to transmit or receive signals, or portions thereof. In some implementations, plurality of antenna elements 312 may be configured to enable beamforming of communications via multiple antenna elements. In some implementations, plurality of antenna elements 312 are configured to communicate in a first communication direction, and a subset of antenna elements 314 (e.g., a subset of plurality of antenna elements 312) are configured to communicate in a second communication direction, as further described herein.

Network entity 350 may include a variety of components (such as structural, hardware components) used for carrying out one or more functions described herein. For example, these components may include a processor 352, a memory 354, a transmitter 356, and a receiver 358. Processor 352 may be configured to execute instructions stored at memory 354 to perform the operations described herein. In some implementations, processor 352 includes or corresponds to controller 240, and memory 354 includes or corresponds to memory 242.

Transmitter 356 is configured to transmit reference signals, synchronization signals, control information, and data to one or more other devices, and receiver 358 is configured to receive reference signals, control information, and data from one or more other devices. For example, transmitter 356 may transmit signaling, control information, and data, and receiver 358 may receive signaling, control information, and data, via a network, such as a wired network, a wireless network, or a combination thereof. For example, network entity 350 may be configured to transmit or receive data via a direct device-to-device connection, a LAN, a WAN, a modem-to-modem connection, the Internet, intranet, extranet, cable transmission system, cellular communication network, any combination of the above, or any other communications network now known or later developed within which permits two or more electronic devices to communicate. In some implementations, transmitter 356 and receiver 358 may be integrated in a transceiver. Additionally, or alternatively, transmitter 356, receiver 358 or both may include and correspond to one or more components of base station 105 described with reference to FIG. 2.

In some implementations, wireless communications system 300 implements a 5G New Radio (NR) network. For example, wireless communications system 300 may include multiple 5G-capable UEs 115 and multiple 5G-capable network entities 350, such as UEs and network entities configured to operate in accordance with a 5G NR network protocol such as that defined by the 3GPP.

During operation of the wireless communications system 300, UE 115 may determine that plurality of antenna elements 312 are to be used to communicate with network entity 350 in a first communication direction. In some implementations, the determination to use plurality of antenna elements 312 may be based on beam measurement operations performed on one or more reference signals, such as one or more channel state information reference signals (CSI-RSs) received from network entity 350. To illustrate, UE 115 may perform one or more beam measurement operations on one or more CSI-RSs received from network entity 350 and, based on the beam measurement operations, UE 115 may determine (e.g., identify) plurality of antenna elements 312 of antenna array 310 and a first set of beamforming weights to use to communicate in the first communication direction. Plurality of antenna elements 312 may include fewer than all of the antenna elements of antenna array 310 or may include all of the antenna elements of antenna array 310.

UE 115 may also communicate with network entity 350 in a second communication direction. To enable communications in the second communication direction, UE 115 may determine (e.g., identify) subset of antenna elements 314 to be used to communicate with network entity 350 in the second communication direction. Subset of antenna elements 314 is a subset (e.g., a proper subset) of plurality of antenna elements 312 (e.g., the plurality of antenna elements used by UE 115 to communicate in the first communication direction). For example, each antenna element included in subset of antenna elements 314 is also included in plurality of antenna elements 312 (e.g., subset of antenna elements 314 does not include any antenna element that is not included in plurality of antenna elements 312). Determining which antenna elements are used to communicate in a particular communication direction is part of a process of determining a spatial domain filter to be used for communication in the particular communication direction. For example, a spatial domain filter may include or correspond to beamforming weights used to communicate in the particular communication direction, which are based on the antenna elements used to communicate in the particular communication direction.

UE 115 may determine subset of antenna elements 314 based on a determination to communicate in the second communication direction and, optionally, based on other information such as a determination that the communication in the second communication direction is to be via upper millimeter wave bands (as a non-limiting example, frequencies that are greater than or equal to 52.6 GHz). UE 115 may determine to activate less than an entirety of plurality of antenna elements 312 when communicating in the second communication direction to reduce power consumption or thermal overshoots associated with components of communication paths corresponding to one or more antenna elements of plurality of antenna elements 312. In some implementations, UE 115 determines subset of antenna elements 314 based on the beam measurement operations performed on the CSI-RSs in the first communication direction. For example, the beam measurements derived from the CSI-RSs in the first communication direction may be reused to determine antenna elements to use for communications in the second communication direction.

Determining to use subset of antenna elements 314 to communicate in the second communication direction may be based on a wireless communication standard specification, such as a 3GPP wireless communication standard specification. For example, a previous version of the 3GPP wireless communication standard specification may specify that a UE transmits signals, such as a physical uplink control channel (PUCCH) or a sounding reference signal (SRS), "using a same spatial domain filter" (or "the same spatial domain transmit filter") as used for receiving at least some signals from a base station. However, to support the techniques described herein, an upcoming version of the 3GPP standard may specify that a UE transmits signals, such as a PUCCH or a SRS, "using potentially a subset of the weights of the same spatial domain filter" (or "a subset of the weights of the same spatial domain transmit filter"), or similar language.

In some implementations, the first communication direction is different from, such as opposite to, the second communication direction. For example, the first communication direction may be a downlink direction (e.g., from network entity 350 to UE 115), and the second communication direction may be an uplink direction (e.g., from UE 115 to network entity 350). Using fewer antenna elements to communicate in the uplink direction may reduce power consumption at UE 115 by disabling power amplifiers or other power-intensive components of one or more transmit paths of UE 115. As another example, the first communication direction may be an uplink direction, and the second communication direction may be a downlink direction.

FIGS. 4A and 4B illustrate examples of an antenna array 400 for a UE according to one or more aspects. Antenna array 400 may include or correspond to antenna array 310 of FIG. 3. Antenna array 400 includes multiple antenna array elements. In some implementations, as shown in FIGS. 4A and 4B, antenna array 400 includes 32 antenna elements arranged in four rows of eight antenna elements each. In other implementations, antenna array 400 includes fewer than 32 or more than 32 antenna elements, and the antenna elements may be arranged in different configurations.

As shown in FIG. 4A, a plurality of antenna elements 402 of antenna array 400 are activated to communicate in a first communication direction, such as a downlink direction, as a non-limiting example. In some implementations, plurality of antenna elements 402 includes eight antenna elements located in the second and third rows of antenna array 400. In other implementations, plurality of antenna elements 402 includes fewer than eight or more than eight antenna elements, and the antenna elements may be different antenna elements of antenna array 400 than are shown in FIG. 4A. Plurality of antenna elements 402 may be selected for communication in the first communication direction based on beam measurement operations performed on one or more reference signals communicated in the first communication direction or in some other manner.

As shown in FIG. 4B, a subset of antenna elements 404 of antenna array 400 are activated to communicate in a second communication direction, such as an uplink direction, as a non-limiting example Subset of antenna elements 404 is a subset of plurality of antenna elements 402 For example, each antenna element included in subset of antenna elements 404 is also included in plurality of antenna elements 402. However, not all antenna elements included in plurality of antenna elements 402 are included in subset of antenna elements 404. In some implementations, as shown in FIG. 4B, subset of antenna elements 404 includes two antenna elements included in the second and third rows of antenna array 400. In other implementations, subset of antenna elements 404 includes fewer than two or more than two antenna elements, and the antenna elements may be different antenna elements of antenna array 400 than shown in FIG. 4B. In some implementations, subset of antenna elements 404 may be determined or selected based on a determination to communicate via upper millimeter wave bands and based on one or more beam measurements performed on one or more reference signals communicated in the first communication direction, as described above. Because subset of antenna elements 404 is a subset of plurality of antenna elements 402, beam correspondence is not completely lost between the first communication direction and the second communication direction, as further described herein.

Returning to FIG. 3, after determining subset of antenna elements 314, UE 115 generates and transmits, to network entity 350, a message 370 indicating that subset of antenna elements 314 is to be used to communicate in the second communication direction. For example, message 370 may include difference indicator 372 that indicates that subset of antenna elements 314 is to be used by UE 115 in communicating with network entity 350 in the second communication direction.

In some implementations, message 370 indicates the antenna elements included in subset of antenna elements 314. In such implementations, difference indicator 372 may include one or more indicators of the antenna elements of subset of antenna elements 314, such as a bitmap that indicates whether each antenna element of antenna array 310 is to be activated during communications in the second communication direction, as a non-limiting example. In some other implementations, difference indicator 372 indicates that a different antenna subarray is used in the second communication direction than in the first communication direction, but does not explicitly indicate which antenna elements are to be used in the second communication direction. For example, difference indicator 372 may include a single bit, or one or more bits, that indicate that a different antenna subarray is to be used for communicating in the second communication direction than is used for communicating in the first communication direction.

In some other implementations, instead of (or in addition to) including difference indicator 372, message 370 does not indicate a lack of beam correspondence between the first communication direction and the second communication direction or a mixed-mode beam correspondence between the first communication direction and the second communication direction. For example, if at least one antenna element used to communicate in the second communication direction is not used to communicate in the first communication direction, UE 115 may transmit a message that includes an indication of no beam correspondence. However, message 370 does not include such an indication (or an indication of mixed-mode beam correspondence).

In some such implementations, message 370 includes state indicator 374. State indicator 374 may indicate a state of beam correspondence between the first communication direction and the second communication direction, thereby at least indirectly indicating subset of antenna elements 314 (as compared to plurality of antenna elements 312). In some implementations, a first state corresponds to a lack of beam correspondence between the first communication direction and the second communication direction (e.g., at least one antenna element used to communicate in the second communication direction is not used to communicate in the first communication direction). In such implementations, a second state corresponds to beam correspondence between the first communication direction and the second communication direction (e.g., the same antenna elements are used to communicate in the first communication direction and the second communication direction). In such implementations, a third state indicates a different state than a lack of beam correspondence and total beam correspondence. Such third state may be indicated by state indicator 374. In some implementations, state indicator 374 includes a multi-bit indicator that indicates the state of the beam correspondence between the first communication direction and the second communication direction. As a non-limiting example, state indicator 374 may include a two-bit indicator where a value of "11" indicates the first state, a value of "00" indicates the second state, and a value of "01" or "10" indicates the third state. In other implementations, state indicator 374 may be a single bit or may include more than two bits, or some other more granular indication. In some implementations, state indicator 374 is included in or corresponds to a UE capability field of message 370. In other implementations, state indicator 374 may be included in another field of message 370.

Based on transmitting message 370 to network entity 350, UE 115 may receive grant message 376 from network entity 350. For example, network entity 350 may receive and process message 370 to determine that subset of antenna elements 314 (or at least a different subset of antenna elements) is to be used by UE 115 in communicating in the second communication direction, and, based on this determination, network entity 350 may generate and transmit grant message 376 to UE 115. Grant message 376 may indicate that UE 115 is allowed (e.g., permitted) to use subset of antenna elements 314 for communicating in the second communication direction. For example, grant message 376 may include a flag or other field that indicates whether UE 115 is allowed to use subset of antenna elements 314 for communicating in the second communication direction.

After receipt of grant message 376 at UE 115, UE 115 and network entity 350 may perform a first communication 378 in the first communication direction, a second communication 380 in the second communication direction, or both. Although described as being performed after receipt of grant message 376, in other implementations, first communication 378 may be performed prior to receipt of grant message 376 at UE 115 or before UE 115 determines (e.g., identifies) subset of antenna elements 314. UE 115 performs first communication 378 using plurality of antenna elements 312 and performs second communication 380 using subset of antenna elements 314. In some implementations, performance of first communication 378 in the first communication direction includes network entity 350 transmitting a first message to UE 115, and performance of second communication 380 in the second communication direction includes network entity 350 receiving a second message from UE 115. For example, network entity 350 may transmit the first message in the downlink direction to UE 115, and UE 115 may transmit the second message in the uplink direction to network entity 350. In some other implementations, performance of first communication 378 in the first communication direction includes network entity 350 receiving a first message from UE 115, and performance of second communication 380 in the second communication direction includes network entity 350 transmitting a second message to UE 115. For example, UE 115 may transmit the first message in the uplink direction to network entity 350, and network entity 350 may transmit the second message in the downlink direction to UE 115.

In some implementations, performing first communication 378 by UE 115 includes UE 115 applying beamforming weights 306 (e.g., a first set of beamforming weights) to first communication 378 and applying subset 308 of beamforming weights (e.g., a second set of beamforming weights) to second communication 380. For example, if first communication 378 is a downlink communication and second communication 380 is an uplink communication, UE 115 may apply beamforming weights 306 to first communication 378 upon receipt (e.g., as part of processing first communication 378) and may apply subset 308 of beamforming weights to second communication 380 prior to transmission of second communication 380. Subset 308 of beamforming weights is a subset (e.g., a proper subset) of beamforming weights 306 and corresponds to subset of antenna elements 314. For example, each beamforming weight included in subset 308 of beamforming weights is also included in beamforming weights 306. Determining the respective sets of beamforming weights may be part of a process of determining a respective spatial domain filter used to communicate in the various communication directions. For example, a first spatial domain filter (e.g., including or corresponding to beamforming weights 306) may be used by UE 115 to communicate in the first communication direction, and a second spatial domain filter (e.g., including or corresponding to subset 308 of beamforming weights) may be used by UE 115 to communicate in the second communication direction. Because subset 308 of beamforming weights is a subset of beamforming weights 306, the second spatial domain filter may be a subset of the first spatial domain filter. Thus, asymmetries between the first spatial domain filter and the second spatial domain filter may be accounted for.

In some such implementations, UE 115 may perform one or more calibration operations on subset 308 of beamforming weights (e.g., the second set of beamforming weights) based on calibration data 309 prior to applying subset 308 of beamforming weights to second communication 380. As described above, calibration data 309 may represent differences between components of communication paths in the first communication direction from components of communication paths in the second communication direction. For example, calibration data 309 may represent differences between power amplifiers in transmit paths and low noise amplifiers in receive paths, among other components. Performing the one or more calibration operations may calibrate (e.g., adjust or modify) subset 308 of beamforming weights to enable beamforming in the second communication direction with greater accuracy or precision.

In some other implementations, wireless communications system 300 includes or corresponds to a private network, such as an industrial network, as compared to a public network, such as a cellular network. In such implementations, network entity 350 may transmit one or more CSI-RSs 382 to UE 115 based on receiving message 370 from UE 115. In such implementations, message 370 includes difference indicator 372 (indicating that a subarray used to communicate in the second communication direction is different from a subarray used to communicate in the first communication direction) and does not include state indicator 374. Based on detecting difference indicator 372, network entity 350 may transmit CSI-RSs 382 to UE 115 instead of transmitting grant message 376. Based on receiving CSI-RSs 382, UE 115 may perform one or more beam measurement operations on CSI-RSs 382 and may generate a set of beamforming weights based on the one or more beamforming operations. UE 115 may apply the set of beamforming weights to one or more signals scheduled for communication in the second communication direction, such as second communication 380. In some implementations, the set of beamforming weights is a subset of beamforming weights 306 (e.g., the subset of beamforming weights used to enable beamforming in the first communication direction). In some other implementations, at least one beamforming weight of the set of beamforming weights is not included in beamforming weights 306.

As described above with reference to FIG. 3, the present disclosure provides techniques for compensating for spatial filter asymmetries at UEs when communicating in the upper millimeter wave bands. For example, UE 115 may determine to communicate in the first communication direction using plurality of antenna elements 312 and may determine to communicate in the second communication direction using subset of antenna elements 314. Because subset of antenna elements 314 is a subset of plurality of antenna elements 312, UE 115 may use a subset of beamforming weights 306 (e.g., subset 308 of beamforming weights) when communicating in the second communication direction. Using subset 308 of beamforming weights may be faster, and use less processing resources, than determining a second set of beamforming weights based on beam measurements of references signals in the second communication direction. Additionally, because some antenna elements of the plurality of antenna elements 312 are deactivated during communication in the second communication direction, power consumption at UE 115 may be reduced. For example, if the second communication direction is the uplink direction, one or more power amplifiers in one or more transmit paths may be deactivated during communication in the second communication direction, which reduces power consumption at UE 115.

Figures 5, 6:
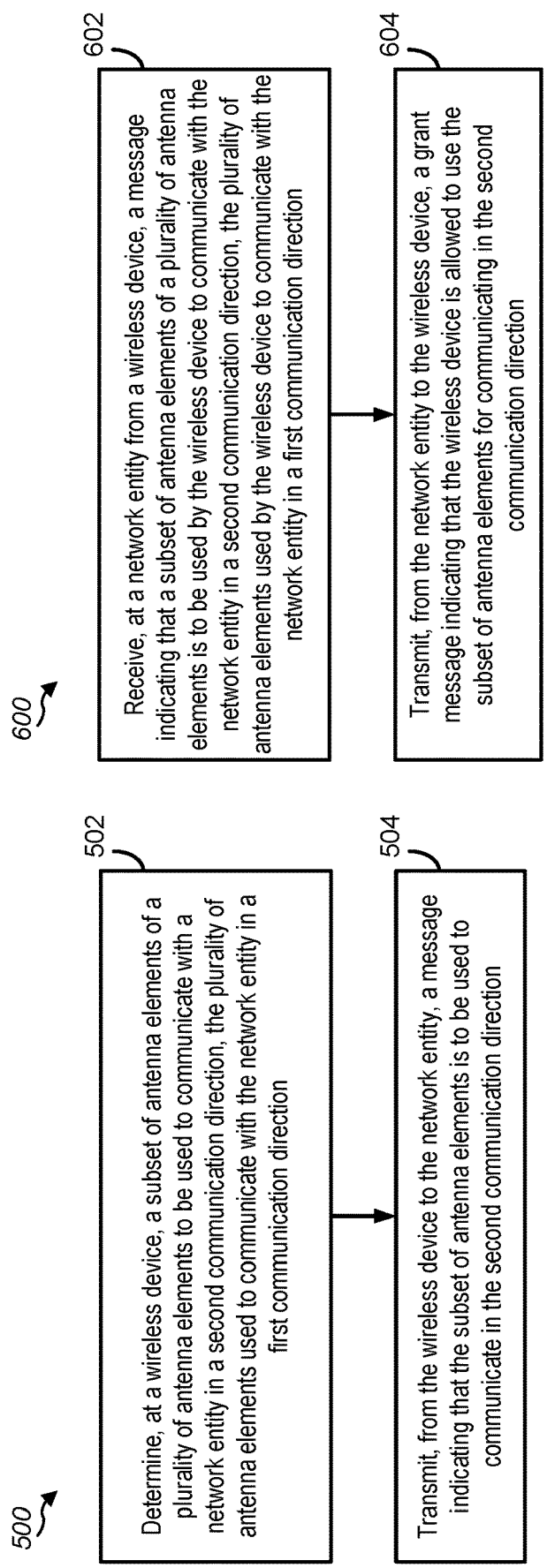
FIG. 5 is a flow diagram illustrating an example process of UE operations for communication according to one or more aspects.
FIG. 6 is a flow diagram illustrating an example process of network entity operations for communication according to one or more aspects.
Figure 7:
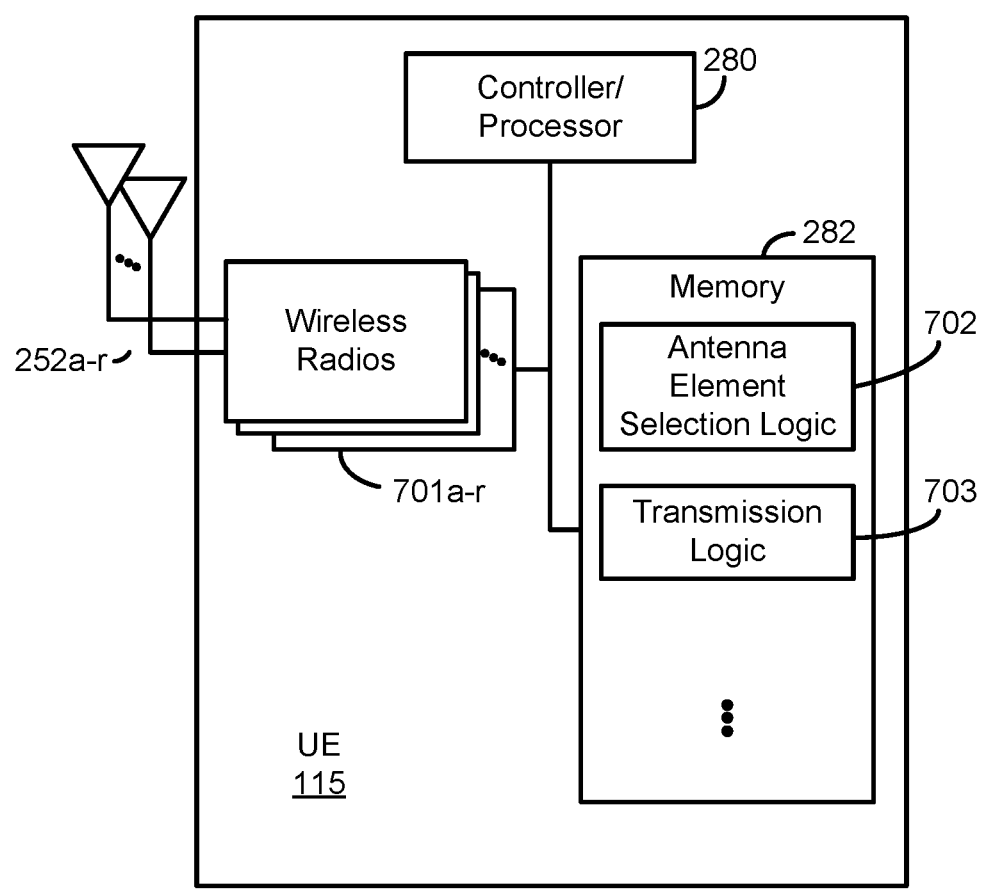
FIG. 7 is a block diagram of an example UE that supports compensating for transmit-receive spatial filter asymmetries according to one or more aspects.

Referring to FIG. 5, a flow diagram illustrating an example process 500 performed by a UE for communication according to one or more aspects is shown. For example, example blocks of process 500 may cause the UE to determine a subset of antenna elements to use for communicating with a network entity in a particular communication direction, according to some aspects of the present disclosure. The example blocks will also be described with respect to UE 115 as illustrated in FIG. 7. FIG. 7 is a block diagram of an example UE 115 that supports compensating for transmit-receive spatial filter asymmetries according to one or more aspects. UE 115 may be configured to perform one or more operations to determine a subset of antenna elements to use for communicating with a network entity in a particular communication direction, according to one aspect of the present disclosure. UE 115 includes the structure, hardware, and components as illustrated for UE 115 of FIG. 2 or 3. For example, UE 115 includes controller 280, which operates to execute logic or computer instructions stored in memory 282, as well as controlling the components of UE 115 that provide the features and functionality of UE 115. UE 115, under control of controller 280, transmits and receives signals via wireless radios 701*a-r* and antennas 252*a-r*. Wireless radios 701*a-r* include various components and hardware, as illustrated in FIG. 2 for UE 115, including modulator and demodulators 254*a-r*, MIMO detector 256, receive processor 258, transmit processor 264, and TX MIMO processor 266.

Figure 8:
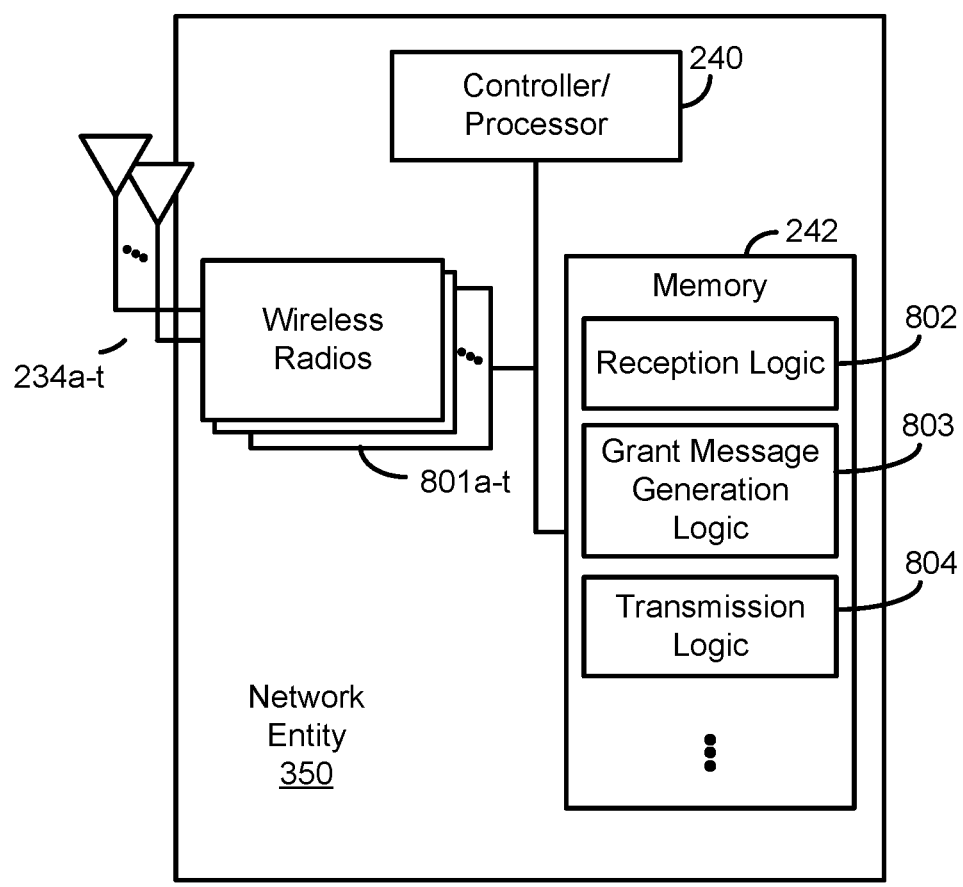
FIG. 8 is a block diagram of an example network entity that supports compensating for transmit-receive spatial filter asymmetries according to one or more aspects.

As shown, memory 282 may include antenna element selection logic 702 and transmission logic 703. Antenna element selection logic 702 and transmission logic 703 may include or correspond to processor 302, transmitter 316, or a combination thereof. For example, antenna element selection logic 702 may be configured to determine a subset of antenna elements of a plurality of antenna elements to be used in a particular communication direction, and transmission logic 703 may be configured to transmit one or more signals, such as message 370. UE 115 may receive signals from or transmit signals to one or more network entities, such as base station 105 of FIGS. 1-2, network entity 350 of FIG. 3, a core network, a core network device, or a network entity as illustrated in FIG. 8.

Returning to FIG. 5, a flow diagram illustrating an example process 500 of UE operations for communication according to one or more aspects is shown. In some implementations, process 500 may be performed by UE 115. In some other implementations, process 500 may be performed by an apparatus configured for wireless communication. For example, the apparatus may include at least one processor, and a memory coupled to the processor. The processor may be configured to perform operations of process 500. In some other implementations, process 500 may be performed or executed using a non-transitory computer-readable medium having program code recorded thereon. The program code may be program code executable by a computer for causing the computer to perform operations of process 500.

As illustrated at block 502, a user equipment (UE) determines a subset of antenna elements of a plurality of antenna elements to be used to communicate with a network entity in a second communication direction. The plurality of antenna elements is used to communicate with the network entity in a first communication direction. As an example of block 502, UE 115 may execute, under control of controller 280, antenna element selection logic 702 stored in memory 282. The execution environment of antenna element selection logic 702 provides the functionality to determine a subset of antenna elements of a plurality of antenna elements to be used to communicate with a network entity in a second communication direction. The plurality of antenna elements is used to communicate with the network entity in a first communication direction.

At block 504, the UE transmits, to the network entity, a message indicating that the subset of antenna elements is to be used to communicate in the second communication direction. To illustrate, UE 115 may transmit a message that indicates that the subset of antenna elements is to be used to communicate in the second communication direction using wireless radios 701*a-r* and antennas 252*a-r*. To further illustrate, UE 115 may execute, under control of controller 280, transmission logic 703 stored in memory 282. The execution environment of transmission logic 703 provides the functionality to transmit a message that indicates that the subset of antenna elements is to be used to communicate in the second communication direction.

In some implementations, the first communication direction is a downlink direction, and the second communication direction is an uplink direction. Alternatively, the first communication direction is an uplink direction, and the second communication direction is a downlink direction.

In some implementations, the message indicates that a different antenna subarray is used in the second communication direction than is used in the first communication direction. In some such implementations, the message does not indicate a lack of beam correspondence between the first communication direction and the second communication direction or a mixed-mode beam correspondence between the first communication direction and the second communication direction. Additionally, or alternatively, a first state corresponds to a lack of beam correspondence between the first communication direction and the second communication direction, a second state corresponds to beam correspondence between the first communication direction and the second communication direction, and the message indicates a third state that is different from the first state and the second state. In some such implementations, the message includes a multi-bit field that indicates the third state. In some such implementations, the multi-bit field includes a UE capability field.

In some implementations, process 500 further includes receiving, from the network entity, a grant message indicating that the UE is allowed to use the subset of antenna elements for communicating in the second communication direction.

In some implementations, process 500 further includes performing a first communication in the first communication direction with the network entity using the plurality of antenna elements, and performing a second communication in the second communication direction with the network entity using the subset of antenna elements. In some such implementations, performing the first communication in the first communication direction includes receiving a first message from the network entity, and performing the second communication in the second communication direction includes transmitting a second message to the network entity. Alternatively, performing the first communication in the first communication direction includes transmitting a first message to the network entity, and performing the second communication in the second communication direction includes receiving a second message from the network entity. Additionally, or alternatively, performing the first communication in the first communication direction includes applying a first set of beamforming weights to the first communication, and performing the second communication in the second communication direction includes applying a second set of beamforming weights to the second communication. The second set of beamforming weights includes a subset of the first set of beamforming weights corresponding to the subset of antenna elements used in the second communication direction. In some such implementations, process 500 further includes, prior to applying the second set of beamforming weights, performing one or more calibration operations on the second set of beamforming weights.

In some implementations, process 500 further includes receiving, from the network entity, one or more channel state information reference signals (CSI-RSs) responsive to transmitting the message. In some such implementations, process 500 also includes performing one or more beam measurement operations on the one or more CSI-RSs, generating a set of beamforming weights based on the one or more beam measurement operations, and applying the set of beamforming weights to a signal scheduled for communication in the second communication direction.

Thus, process 500 enables a UE to compensate spatial filter asymmetries, at least when communicating via upper millimeter wave bands. For example, the UE may determine to use a subset of antenna elements to communicate in a second communication direction, which does not totally destroy beam correspondence between a first communication direction and the second communication direction. Additionally, the UE may deactivate one or more components of communication paths when communicating in the second communication direction, which may reduce power consumption at the UE.

FIG. 6 is a flow diagram illustrating an example process 600 performed by a network entity for communication according to one or more aspects. For example, example blocks of the process 600 may cause the network entity to transmit a grant message indicating that a UE may use a subset of antenna elements for communicating in a particular communication direction according to some aspects of the present disclosure. The example blocks will also be described with respect to the network entity 350 as illustrated in FIG. 8. FIG. 8 is a block diagram illustrating an example network entity 350 that supports compensating for transmit-receive spatial filter asymmetries according to one or more aspects. Network entity 350 may include base station 105, a network, or a core network, as illustrative, non-limiting examples. Network entity 350 includes the structure, hardware, and components as illustrated for base station 105 of FIGS. 1 and 2, network entity 350 of FIG. 3, or a combination thereof. For example, network entity 350 may include controller 240, which operates to execute logic or computer instructions stored in memory 242, as well as controlling the components of network entity 350 that provide the features and functionality of network entity 350. Network entity 350, under control of controller 240, transmits and receives signals via wireless radios 801a-t and antennas 234a-t. Wireless radios 801a-t include various components and hardware, as illustrated in FIG. 2 for network entity 350 (such as base station 105), including modulator and demodulators 232a-t, transmit processor 220, TX MIMO processor 230, MIMO detector 236, and receive processor 238.

As shown, memory 242 may include reception logic 802, grant message generation logic 803, and transmission logic 804. Reception logic 802, grant message generation logic 803, and transmission logic 804 may include or correspond to processor 352, transmitter 356, receiver 358, or a combination thereof. For example, reception logic 802 may be configured to receive one or more signals, such as message 370, grant message generation logic 803 may be configured to generate a grant message, such as grant message 376, and transmission logic 804 may be configured to transmit one or more signals, such as grant message 376, first communication 378, second communication 380, CSI-RSs 382, or a combination thereof. Network entity 350 may receive signals from or transmit signals to one or more UEs, such as UE 115 of FIG. 1-3 or 7.

Returning to FIG. 6, a flow diagram illustrating an example process 600 of network entity operations for communication according to one or more aspects is shown. In some implementations, process 600 may be performed by network entity 350. In some other implementations, process 600 may be performed by an apparatus configured for wireless communication. For example, the apparatus may include at least one processor, and a memory coupled to the processor. The processor may be configured to perform operations of process 600. In some other implementations, process 600 may be performed or executed using a non-transitory computer-readable medium having program code recorded thereon. The program code may be program code executable by a computer for causing the computer to perform operations of process 600.

As illustrated at block 602, a network entity receives, from a user equipment (UE), a message indicating that a subset of antenna elements of a plurality of antenna elements is to be used by the UE to communicate with the network entity in a second communication direction. The plurality of antenna elements is used by the UE to communicate with the network entity in a first communication direction. To illustrate, network entity 350 may receive the message using wireless radios 801a-t and antennas 234a-t. To further illustrate, network entity 350 may execute, under control of controller 240, reception logic 802 stored in memory 242. The execution environment of reception logic 802 provides the functionality to receive, from a UE, a message indicating that a subset of antenna elements of a plurality of antenna elements is to be used by the UE to communicate with the network entity in a second communication direction. The plurality of antenna elements is used by the UE to communicate with the network entity in a first communication direction.

At block 604, the network entity transmits, to the UE, a grant message indicating that the UE is allowed to use the subset of antenna elements for communicating in the second communication direction. As an example of block 602, network entity 350 may execute, under control of controller 240, grant message generation logic 803 stored in memory 242. The execution environment of grant message generation logic 803 provides the functionality to generate a grant message indicating that the UE is allowed to use the subset of antenna elements for communicating in the second communication direction. As another example, network entity 350 may transmit the grant message using wireless radios 801a-t and antennas 234a-t. To further illustrate, network entity 350 may execute, under control of controller 240, transmission logic 804 stored in memory 242. The execution environment of transmission logic 804 provides the functionality to transmit the grant message to the UE.

In some implementations, the first communication direction is a downlink direction, and the second communication direction is an uplink direction. Alternatively, the first communication direction is an uplink direction, and the second communication direction is a downlink direction.

In some implementations, the message indicates that a different antenna subarray is used in the second communication direction than is used in the first communication direction. In some such implementations, the message does not indicate a lack of beam correspondence between the first communication direction and the second communication direction or a mixed-mode beam correspondence between the first communication direction and the second communication direction. Additionally, or alternatively, a first state corresponds to a lack of beam correspondence between the first communication direction and the second communication direction, a second state corresponds to beam correspondence between the first communication direction and the second communication direction, and the message indicates a third state that is different from the first state and the second state. In some such implementations, the message includes a multi-bit field that indicates the third state. In some such implementations, the multi-bit field includes a UE capability field.

In some implementations, process 600 further includes performing a first communication in the first communication direction with the UE. The first communication corresponds to the plurality of antenna elements. Process 600 also includes performing a second communication in the second communication direction with the UE. The second communication corresponds to the subset of antenna elements. In some such implementations, performing the first communication in the first communication direction includes transmitting a first message to the UE, and performing the second communication in the second communication direction includes receiving a second message from the UE. Alternatively, performing the first communication in the first communication direction includes receiving a first message from the UE, and performing the second communication in the second communication direction includes transmitting a second message to the UE.

In some implementations, process 600 further includes transmitting, to the UE, one or more channel state information reference signals (CSI-RSs) responsive to receiving the message.

Thus, process 600 enables a UE to compensate spatial filter asymmetries, at least when communicating via upper millimeter wave bands. For example, the UE may determine to use a subset of antenna elements to communicate in a second communication direction, which may be enabled by a network entity transmitting a grant message to the UE. Using the subset of antenna elements at the UE does not totally destroy beam correspondence between a first communication direction and the second communication direction. Additionally, the UE may deactivate one or more components of communication paths when communicating in the second communication direction, which may reduce power consumption at the UE.

It is noted that one or more blocks (or operations) described with reference to FIGS. 5 and 6 may be combined with one or more blocks (or operations) of another figure. For example, one or more blocks (or operations) of FIG. 5 may be combined with one or more blocks (or operations) FIG. 6. As another example, one or more blocks of FIG. 5 or 6 may be combined with one or more blocks (or operations) of another of FIG. 2 or 3. Additionally, or alternatively, one or more operations described above with reference to FIGS. 1-7 may be combined with one or more operations described with reference to FIG. 8.

In some aspects, techniques for compensating for transmit-receive spatial filter asymmetries, such as in upper millimeter wave bands, may include additional aspects, such as any single aspect or any combination of aspects described below or in connection with one or more other processes or devices described elsewhere herein. In some aspects, compensating for transmit-receive spatial filter asymmetries may include an apparatus determining a subset of antenna elements of a plurality of antenna elements to be used to communicate with a network entity in a second communication direction. The plurality of antenna elements is used to communicate with the network entity in a first communication direction. The apparatus may also transmit, to the network entity, a message indicating that the subset of antenna elements is to be used to communicate in the second communication direction. In some implementations, the apparatus includes a wireless device, such as a UE, a CPE, a repeater, a relay node, an IAB node, or the like. In some implementations, the apparatus may include at least one processor, and a memory coupled to the processor. The processor may be configured to perform operations described herein with respect to the wireless device. In some other implementations, the apparatus may include a non-transitory computer-readable medium having program code recorded thereon and the program code may be executable by a computer for causing the computer to perform operations described herein with reference to the wireless device. In some implementations, the apparatus may include one or more means configured to perform operations described herein.

In a first aspect, the first communication direction is a downlink direction, and the second communication direction is an uplink direction.

In a second aspect, the first communication direction is an uplink direction, and the second communication direction is a downlink direction.

In a third aspect, alone or in combination with one or more of the first through second aspects, the message indicates that a different antenna subarray is used in the second communication direction than is used in the first communication direction.

In a fourth aspect, in combination with the third aspect, the message does not indicate a lack of beam correspondence between the first communication direction and the second communication direction or a mixed-mode beam correspondence between the first communication direction and the second communication direction.

In a fifth aspect, in combination with the third aspect, a first state corresponds to a lack of beam correspondence between the first communication direction and the second communication direction, a second state corresponds to beam correspondence between the first communication direction and the second communication direction, and the message indicates a third state that is different from the first state and the second state.

In a sixth aspect, in combination with the fifth aspect, the message includes a multi-bit field that indicates the third state.

In a seventh aspect, in combination with the sixth aspect, the multi-bit field includes a UE capability field.

In an eighth aspect, alone or in combination with one or more of the first through seventh aspects, the apparatus receives, from the network entity, a grant message indicating that the apparatus is allowed to use the subset of antenna elements for communicating in the second communication direction.

In a ninth aspect, alone or in combination with one or more of the first through eighth aspects, the apparatus performs a first communication in the first communication direction with the network entity using the plurality of antenna elements and performs a second communication in the second communication direction with the network entity using the subset of antenna elements.

In a tenth aspect, in combination with the ninth aspect, performing the first communication in the first communication direction includes receiving a first message from the network entity, and performing the second communication in the second communication direction includes transmitting a second message to the network entity.

In an eleventh aspect, in combination with the ninth aspect, performing the first communication in the first communication direction includes transmitting a first message to the network entity, and performing the second communication in the second communication direction includes receiving a second message from the network entity.

In a twelfth aspect, in combination with the ninth aspect, performing the first communication in the first communication direction includes applying a first set of beamforming weights to the first communication, and performing the second communication in the second communication direction includes applying a second set of beamforming weights to the second communication. The second set of beamforming weights includes a subset of the first set of beamforming weights corresponding to the subset of antenna elements used in the second communication direction.

In a thirteenth aspect, in combination with the twelfth aspect, the apparatus, prior to applying the second set of beamforming weights, performs one or more calibration operations on the second set of beamforming weights.

In a fourteenth aspect, alone or in combination with one or more of the first through thirteenth aspects, the apparatus receives, from the network entity, one or more channel state information reference signals (CSI-RSs) responsive to transmitting the message.

In a fifteenth aspect, in combination with the fourteenth aspect, the apparatus performs one or more beam measurement operations on the one or more CSI-RSs, generates a set of beamforming weights based on the one or more beam measurement operations, and applies the set of beamforming weights to a signal scheduled for communication in the second communication direction.

In some aspects, an apparatus configured for wireless communication, such as a network entity, is configured to receive, from a wireless device, a message indicating that a subset of antenna elements of a plurality of antenna elements is to be used by the wireless device to communicate with the network entity in a second communication direction. The plurality of antenna elements is used by the wireless device to communicate with the network entity in a first communication direction. The apparatus is also configured to transmit, to the wireless device, a grant message indicating that the wireless device is allowed to use the subset of antenna elements for communicating in the second communication direction. In some implementations, the apparatus includes a wireless device, such as a network entity. In some implementations, the apparatus may include at least one processor, and a memory coupled to the processor. The processor may be configured to perform operations described herein with respect to the wireless device. In some other implementations, the apparatus may include a non-transitory computer-readable medium having program code recorded thereon and the program code may be executable by a computer for causing the computer to perform operations described herein with reference to the wireless device. In some implementations, the apparatus may include one or more means configured to perform operations described herein.

In a sixteenth aspect, the first communication direction is a downlink direction, and the second communication direction is an uplink direction.

In a seventeenth aspect, the first communication direction is an uplink direction, and the second communication direction is a downlink direction.

In an eighteenth aspect, alone or in combination with one or more of the sixteenth through seventeenth aspects, the message indicates that a different antenna subarray is used in the second communication direction than is used in the first communication direction.

In a nineteenth aspect, in combination with the eighteenth aspect, the message does not indicate a lack of beam correspondence between the first communication direction and the second communication direction or a mixed-mode beam correspondence between the first communication direction and the second communication direction.

In a twentieth aspect, in combination with the eighteenth aspect, a first state corresponds to a lack of beam correspondence between the first communication direction and the second communication direction, a second state corresponds to beam correspondence between the first communication direction and the second communication direction, and the message indicates a third state that is different from the first state and the second state.

In a twenty-first aspect, in combination with the twentieth aspect, the message includes a multi-bit field that indicates the third state.

In a twenty-second aspect, in combination with the twenty-first aspect, the multi-bit field includes a UE capability field.

In a twenty-third aspect, alone or in combination with one or more of the sixteenth through twenty-second aspects, the apparatus performs a first communication in the first communication direction with the wireless device. The first communication corresponds to the plurality of antenna elements. The apparatus also performs a second communication in the second communication direction with the wireless device. The second communication corresponds to the subset of antenna elements.

In a twenty-fourth aspect, in combination with the twenty-third aspect, performing the first communication in the first communication direction includes transmitting a first message to the wireless device, and performing the second communication in the second communication direction includes receiving a second message from the wireless device.

In a twenty-fifth aspect, in combination with the twenty-fourth aspect, performing the first communication in the first communication direction includes receiving a first message from the wireless device, and performing the second communication in the second communication direction includes transmitting a second message to the wireless device.

In a twenty-sixth aspect, alone or in combination with one or more of the sixteenth through twenty-fifth aspects, the apparatus transmits, to the wireless device, one or more channel state information reference signals (CSI-RSs) responsive to receiving the message.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Components, the functional blocks, and the modules described herein with respect to FIGS. 1-8 may include processors, electronics devices, hardware devices, electronics components, logical circuits, memories, software codes, firmware codes, among other examples, or any combination thereof. In addition, features discussed herein may be implemented via specialized processor circuitry, via executable instructions, or combinations thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logics, logical blocks, modules, circuits, and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, or any conventional processor, controller, microcontroller, or state machine. In some implementations, a processor may also be implemented as a combination of computing devices, such as a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their equivalents thereof, or in any combination thereof. Implementations of the subject matter described in this specification also may be implemented as one or more computer programs, that is one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that may be enabled to transfer a computer program from one place to another. A storage media may be any available media that may be accessed by a computer. By way of example, and not limitation, such computer-readable media may include random-access memory (RAM), read-only memory (ROM), electrically erasable programmable read-only memory (EEPROM), CD-ROM or other optical disk storage, magnetic disk storage or other magnetic storage devices, or any other medium that may be used to store desired program code in the form of instructions or data structures and that may be accessed by a computer. Also, any connection may be properly termed a computer-readable medium. Disk and disc, as used herein, includes compact disc (CD), laser disc, optical disc, digital versatile disc (DVD), hard disk, solid state disk, floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to some other implementations without departing from the spirit or scope of this disclosure. Thus, the claims are not intended to be limited to the implementations shown herein, but are to be accorded the widest scope consistent with this disclosure, the principles and the novel features disclosed herein.

Additionally, a person having ordinary skill in the art will readily appreciate, the terms "upper" and "lower" are sometimes used for ease of describing the figures, and indicate relative positions corresponding to the orientation of the figure on a properly oriented page, and may not reflect the proper orientation of any device as implemented.

Certain features that are described in this specification in the context of separate implementations also may be implemented in combination in a single implementation. Conversely, various features that are described in the context of a single implementation also may be implemented in multiple implementations separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted may be incorporated in the example processes that are schematically illustrated. For example, one or more additional operations may be performed before, after, simultaneously, or between any of the illustrated operations. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products. Additionally, some other implementations are within the scope of the following claims. In some cases, the actions recited in the claims may be performed in a different order and still achieve desirable results.

As used herein, including in the claims, the term "or," when used in a list of two or more items, means that any one of the listed items may be employed by itself, or any combination of two or more of the listed items may be employed. For example, if a composition is described as containing components A, B, or C, the composition may contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (that is A and B and C) or any of these in any combination thereof. The term "substantially" is defined as largely but not necessarily wholly what is specified (and includes what is specified; for example, substantially 90 degrees includes 90 degrees and substantially parallel includes parallel), as understood by a person of ordinary skill in the art. In any disclosed implementations, the term "substantially" may be substituted with "within [a percentage] of" what is specified, where the percentage includes 0.1, 1, 5, or 10 percent.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

The invention claimed is:

1. A method of wireless communication, the method comprising:
    selecting, at a wireless device, a subset of antenna elements of a plurality of antenna elements to be used to communicate with a network entity in a second communication direction, wherein the plurality of antenna elements is used to communicate with the network entity in a first communication direction, and wherein the subset of antenna elements includes less than an entirety of the plurality of antenna elements; and
    transmitting, from the wireless device to the network entity, a message indicating that the subset of antenna elements is to be used to communicate in the second communication direction, the message including a state indicator, wherein a particular value of the state indicator corresponds to a state that is different from beam correspondence between the first communication direction and the second communication direction and from a lack of beam correspondence between the first communication direction and the second communication direction.

2. The method of claim 1, wherein the first communication direction is a downlink direction, and wherein the second communication direction is an uplink direction.

3. The method of claim 1, wherein the first communication direction is an uplink direction, and wherein the second communication direction is a downlink direction.

4. The method of claim 1, further comprising receiving, from the network entity, a grant message indicating that the wireless device is allowed to use the subset of antenna elements for communicating in the second communication direction.

5. The method of claim 1, further comprising:
    performing a first communication in the first communication direction with the network entity using the plurality of antenna elements; and
    performing a second communication in the second communication direction with the network entity using the subset of antenna elements.

6. The method of claim 5, wherein:
    performing the first communication in the first communication direction comprises receiving a first message from the network entity; and
    performing the second communication in the second communication direction comprises transmitting a second message to the network entity.

7. The method of claim 5, wherein:
    performing the first communication in the first communication direction comprises transmitting a first message to the network entity; and
    performing the second communication in the second communication direction comprises receiving a second message from the network entity.

8. The method of claim 1, further comprising:
    performing a first communication in the first communication direction, wherein performing the first communication in the first communication direction comprises applying a first set of beamforming weights to the first communication; and
    performing a second communication in the second communication direction, wherein performing the second communication in the second communication direction comprises applying a second set of beamforming weights to the second communication, and wherein:

the second set of beamforming weights comprises a subset of the first set of beamforming weights that includes less than an entirety of the first set of beamforming weights, the second set of beamforming weights corresponds to the subset of antenna elements used in the second communication direction, the first communication direction is a downlink direction or an uplink direction, and the second communication direction is the other of the downlink direction or the uplink direction.

9. The method of claim 8, further comprising, prior to applying the second set of beamforming weights, performing one or more calibration operations on the second set of beamforming weights.

10. The method of claim 1, further comprising:
receiving, from the network entity, one or more channel state information reference signals (CSI-RSs) responsive to transmitting the message;
performing one or more beam measurement operations on the one or more CSI-RSs;
generating a set of beamforming weights based on the one or more beam measurement operations; and
applying the set of beamforming weights to a signal scheduled for communication in the second communication direction.

11. The method of claim 1, wherein the plurality of antenna elements includes each antenna element included in the subset of antenna elements and one or more additional antenna elements of the wireless device.

12. The method of claim 1, wherein determining the subset of antenna elements to be used to communicate in the second communication direction comprises determining to deactivate one or more of the plurality of antenna elements to communicate in the second communication direction.

13. The method of claim 1, wherein the state indicator comprises a multi-bit field indicative of one of at least three states, the at least three states including a first state corresponding to a lack of beam correspondence between the first communication direction and the second communication direction, a second state corresponding to beam correspondence between the first communication direction and the second communication direction, and a third state distinct from the first state and from the second state, the particular value corresponding to the third state.

14. An apparatus configured for wireless communication, the apparatus comprising:
at least one processor; and
a memory coupled to the at least one processor, wherein the at least one processor is configured to:
select, at a wireless device, a subset of antenna elements of a plurality of antenna elements to be used to communicate with a network entity in a second communication direction, wherein the plurality of antenna elements is used to communicate with the network entity in a first communication direction, and wherein the subset of antenna elements includes less than an entirety of the plurality of antenna elements; and
initiate transmission, from the wireless device to the network entity, of a message indicating that the subset of antenna elements is to be used to communicate in the second communication direction, the message including a state indicator, wherein a particular value of the state indicator corresponds to a state that is different from beam correspondence between the first communication direction and the second communication direction and from a lack of beam correspondence between the first communication direction and the second communication direction.

15. The apparatus of claim 14, wherein the message does not indicate a lack of beam correspondence between the first communication direction and the second communication direction or a mixed-mode beam correspondence between the first communication direction and the second communication direction.

16. The apparatus of claim 14, wherein:
a first state corresponds to a lack of beam correspondence between the first communication direction and the second communication direction;
a second state corresponds to beam correspondence between the first communication direction and the second communication direction; and
the particular value of the state indicator corresponds to a third state that is different from the first state and the second state.

17. The apparatus of claim 16, wherein the state indicator comprises a multi-bit user equipment (UE) capability field that indicates the third state.

18. A method of wireless communication, the method comprising:
receiving, at a network entity from a wireless device, a message indicating that a subset of antenna elements of a plurality of antenna elements is to be used by the wireless device to communicate with the network entity in a second communication direction, wherein:
the plurality of antenna elements is used by the wireless device to communicate with the network entity in a first communication direction,
the subset of antenna elements includes less than an entirety of the plurality of antenna elements,
a different antenna subarray is used in the second communication direction than is used in the first communication direction,
the message includes a state indicator, and
a particular value of the state indicator corresponds to a state that is different from beam correspondence between the first communication direction and the second communication direction and from a lack of beam correspondence between the first communication direction and the second communication direction; and
transmitting, from the network entity to the wireless device, a grant message indicating that the wireless device is allowed to use the subset of antenna elements for communicating in the second communication direction.

19. The method of claim 18, wherein the first communication direction is a downlink direction, and wherein the second communication direction is an uplink direction.

20. The method of claim 18, wherein the first communication direction is an uplink direction, and wherein the second communication direction is a downlink direction.

21. The method of claim 18, further comprising:
performing a first communication in the first communication direction with the wireless device, the first communication corresponding to the plurality of antenna elements; and
performing a second communication in the second communication direction with the wireless device, the second communication corresponding to the subset of antenna elements.

22. The method of claim 21, wherein:
performing the first communication in the first communication direction comprises transmitting a first message to the wireless device; and
performing the second communication in the second communication direction comprises receiving a second message from the wireless device.

23. The method of claim 21, wherein:
performing the first communication in the first communication direction comprises receiving a first message from the wireless device; and
performing the second communication in the second communication direction comprises transmitting a second message to the wireless device.

24. The method of claim 18, further comprising transmitting, to the wireless device, one or more channel state information reference signals (CSI-RSs) responsive to receiving the message.

25. An apparatus configured for wireless communication, the apparatus comprising:
at least one processor; and
a memory coupled to the at least one processor, wherein the at least one processor is configured to:
receive, at a network entity from a wireless device, a message indicating that a subset of antenna elements of a plurality of antenna elements is to be used by the wireless device to communicate with the network entity in a second communication direction, wherein:
the plurality of antenna elements is used by the wireless device to communicate with the network entity in a first communication direction,
the subset of antenna elements includes less than an entirety of the plurality of antenna elements,
a different antenna subarray is used in the second communication direction than is used in the first communication direction,
the message includes a state indicator, and
a particular value of the state indicator corresponds to a state that is different from beam correspondence between the first communication direction and the second communication direction and from a lack of beam correspondence between the first communication direction and the second communication direction; and
initiate transmission, from the network entity to the wireless device, of a grant message indicating that the wireless device is allowed to use the subset of antenna elements for communicating in the second communication direction.

26. The apparatus of claim 25, wherein the message does not indicate a lack of beam correspondence between the first communication direction and the second communication direction or a mixed-mode beam correspondence between the first communication direction and the second communication direction.

27. The apparatus of claim 25, wherein:
a first state corresponds to a lack of beam correspondence between the first communication direction and the second communication direction;
a second state corresponds to beam correspondence between the first communication direction and the second communication direction; and
the particular value of the state indicator corresponds to a third state that is different from the first state and the second state.

28. The apparatus of claim 27, wherein the state indicator comprises a multi-bit user equipment (UE) capability field that indicates the third state.

* * * * *